US011161506B2

(12) United States Patent
Ogata et al.

(10) Patent No.: US 11,161,506 B2
(45) Date of Patent: Nov. 2, 2021

(54) TRAVEL SUPPORT DEVICE AND NON-TRANSITORY COMPUTER-READABLE MEDIUM

(71) Applicant: ZENRIN CO., LTD., Kitakyushu (JP)

(72) Inventors: Shinji Ogata, Kitakyushu (JP); Keigo Odahara, Kitakyushu (JP)

(73) Assignee: ZENRIN CO., LTD., Kitakyushu (JP)

(*) Notice: Subject to any disclaimer, the term of this patent is extended or adjusted under 35 U.S.C. 154(b) by 184 days.

(21) Appl. No.: 16/579,858

(22) Filed: Sep. 24, 2019

(65) Prior Publication Data

US 2020/0031343 A1 Jan. 30, 2020

Related U.S. Application Data

(63) Continuation of application No. PCT/JP2018/006826, filed on Feb. 23, 2018.

(30) Foreign Application Priority Data

Apr. 27, 2017 (JP) .............................. JP2017-087802

(51) Int. Cl.
*B60W 30/10* (2006.01)
*B60W 30/09* (2012.01)
*G08G 1/16* (2006.01)

(52) U.S. Cl.
CPC ............ *B60W 30/10* (2013.01); *B60W 30/09* (2013.01); *G08G 1/167* (2013.01); *B60W 2520/10* (2013.01)

(58) Field of Classification Search
CPC .. B60W 30/10; B60W 30/09; B60W 2520/10; B60W 30/18163; B60W 30/12; B60W 50/14; G08G 1/167; G01C 21/34
See application file for complete search history.

(56) References Cited

U.S. PATENT DOCUMENTS

| 6,415,222 B1 | 7/2002 | Sato et al. | |
| 7,424,357 B2* | 9/2008 | Ozaki | G08G 1/04 |
| | | | 701/70 |

(Continued)

FOREIGN PATENT DOCUMENTS

| JP | 2001-74490 A | 3/2001 |
| JP | 2005-138623 A | 6/2005 |

(Continued)

OTHER PUBLICATIONS

International Search Report and Written Opinion dated May 29, 2018 for PCT/JP2018/006826 filed on Feb. 23, 2018, 8 pages including English Translation of the International Search Report.

*Primary Examiner* — Jason Holloway
(74) *Attorney, Agent, or Firm* — Xsensus LLP

(57) ABSTRACT

A travel support device including a memory that stores first section information regarding a first section included in a first lane of a road, second section information regarding a second section adjacent to a front in a traveling direction of the first section, and third section information regarding a third section included in a second lane of the road, and the second lane is added to and splits off from the first lane, the second lane is adjacent to the first lane, the third section is a section adjacent to the second section, travel increase information is associated with the third section information when the second lane is a traveling lane, and uphill increase information is associated with the third section information when the second lane is an uphill lane; and processing circuitry that guides a vehicle based on the travel increase information and the uphill increase information.

19 Claims, 27 Drawing Sheets

(56) References Cited

U.S. PATENT DOCUMENTS

| | | |
|---|---|---|
| 8,103,423 B2 | 1/2012 | Inoue |
| 2009/0037071 A1 | 2/2009 | Inoue |
| 2009/0222202 A1 | 9/2009 | Kato |
| 2011/0128139 A1 | 6/2011 | Tauchi et al. |
| 2011/0231095 A1* | 9/2011 | Nakada ............... B60W 30/12 701/301 |
| 2014/0156133 A1 | 6/2014 | Cullinane et al. |
| 2014/0156134 A1 | 6/2014 | Cullinane et al. |
| 2014/0330478 A1 | 11/2014 | Cullinane et al. |
| 2015/0284009 A1 | 10/2015 | Cullinane et al. |
| 2015/0345964 A1* | 12/2015 | Oooka ............... B60W 30/16 701/41 |
| 2016/0200326 A1 | 7/2016 | Cullinane et al. |
| 2017/0043788 A1 | 2/2017 | Cullinane et al. |
| 2017/0057543 A1 | 3/2017 | Sakaguchi et al. |
| 2017/0253253 A1 | 9/2017 | Cullinane et al. |
| 2018/0043904 A1 | 2/2018 | Cullinane et al. |
| 2018/0045516 A1 | 2/2018 | Sumizawa |
| 2018/0172455 A1 | 6/2018 | Yamaguchi et al. |
| 2018/0334173 A1 | 11/2018 | Cullinane et al. |
| 2019/0285421 A1* | 9/2019 | Johnston ............... G01C 21/26 |
| 2019/0291746 A1 | 9/2019 | Cullinane et al. |

FOREIGN PATENT DOCUMENTS

| | | |
|---|---|---|
| JP | 2006-98232 A | 4/2006 |
| JP | 2007-101307 A | 4/2007 |
| JP | 2007-272276 A | 10/2007 |
| JP | 2008-175581 A | 7/2008 |
| JP | 2008-232821 A | 10/2008 |
| JP | 2009-35223 A | 2/2009 |
| JP | 2009-204514 A | 9/2009 |
| JP | 2010-30484 A | 2/2010 |
| JP | 2011-113385 A | 6/2011 |
| JP | 2013-130464 A | 7/2013 |
| JP | 2016-504232 A | 2/2016 |
| JP | 2016-176769 A | 10/2016 |
| JP | 2016-177555 A | 10/2016 |
| JP | 2016-181031 A | 10/2016 |
| JP | 2017-44474 A | 3/2017 |
| JP | 2017-49755 A | 3/2017 |
| WO | 2016/189732 A1 | 12/2016 |

* cited by examiner

FIG. 2

ATTRIBUTE DATA 33

| CLASSIFICATION | TYPE | DEFINITION |
|---|---|---|
| LANE TYPE | TRAVEL LANE | LANES OTHER THAN RIGHT END |
| | OVERTAKING LANE | RIGHT END LANE WHERE OVERTAKING VEHICLES PASS |
| | UPHILL LANE | LANE ADDED TO LEFT SIDE TO SEPARATE VEHICLE WHICH SLOWS DOWN DUE TO WEIGHT OR THE LIKE FROM OTHER VEHICLES ON ROAD WITH UPHILL SLOPE |
| | YIELD LANE | LANE ADDED TO LEFT SIDE AS EVACUATION LANE WHEN LEADING VEHICLE GIVES WAY TO FOLLOWING VEHICLE |
| | ACCELERATION LANE | SECTION EXCLUDING "WIDTH CHANGE SECTION" OF SPEED CHANGE LANE |
| | DECELERATION LANE | |
| FORK/MERGE TYPE | NO CHANGE | GRANTED TO FIXED WIDTH SECTIONS, OTHER THAN "FORK", "MERGE", "INCREASE", AND "DECREASE" |
| | FORK | SECTION WHERE WIDTH CHANGES DUE TO INCREASE OR DECREASE IN NUMBER OF LANES AND BECOMES CONSTANT, OF "SPEED CHANGE LANES" AT FORK/MERGE JUNCTION POINTS |
| | MERGE | |
| | INCREASE | SECTION WHERE WIDTH CHANGES AND BECOMES CONSTANT, IN POINT WHERE NUMBER OF LANES INCREASES |
| | DECREASE | |

*FIG. 4*

LANE NETWORK DATA  31

| | | | | | |
|---|---|---|---|---|---|
| L10 | IDENTIFICATION INFORMATION | L10 | IDENTIFICATION INFORMATION | L11 | L11 |
| | COORDINATE INFORMATION | (X, Y, Z)... | COORDINATE INFORMATION | (X, Y, Z)... | |
| | EXIT SIDE IDENTIFICATION INFORMATION | L11, L111 | EXIT SIDE IDENTIFICATION INFORMATION | L12 | |
| | ENTRY SIDE IDENTIFICATION INFORMATION | ... | ENTRY SIDE IDENTIFICATION INFORMATION | L10 | |
| L12 | IDENTIFICATION INFORMATION | L12 | IDENTIFICATION INFORMATION | L13 | L13 |
| | COORDINATE INFORMATION | (X, Y, Z)... | COORDINATE INFORMATION | (X, Y, Z)... | |
| | EXIT SIDE IDENTIFICATION INFORMATION | L13 | EXIT SIDE IDENTIFICATION INFORMATION | L14 | |
| | ENTRY SIDE IDENTIFICATION INFORMATION | L11 | ENTRY SIDE IDENTIFICATION INFORMATION | L12 | |
| L14 | IDENTIFICATION INFORMATION | L14 | IDENTIFICATION INFORMATION | L15 | L15 |
| | COORDINATE INFORMATION | (X, Y, Z)... | COORDINATE INFORMATION | (X, Y, Z)... | |
| | EXIT SIDE IDENTIFICATION INFORMATION | ... | EXIT SIDE IDENTIFICATION INFORMATION | L16 | |
| | ENTRY SIDE IDENTIFICATION INFORMATION | L13, L113 | ENTRY SIDE IDENTIFICATION INFORMATION | ... | |

| | IDENTIFICATION INFORMATION | L16 | | IDENTIFICATION INFORMATION | L17 | |
|---|---|---|---|---|---|---|
| L16 — | COORDINATE INFORMATION | (X, Y, Z)··· | | COORDINATE INFORMATION | (X, Y, Z)··· | — L17 |
| | EXIT SIDE IDENTIFICATION INFORMATION | L17 | | EXIT SIDE IDENTIFICATION INFORMATION | L18 | |
| | ENTRY SIDE IDENTIFICATION INFORMATION | L15 | | ENTRY SIDE IDENTIFICATION INFORMATION | L16 | |
| | IDENTIFICATION INFORMATION | L18 | | IDENTIFICATION INFORMATION | L19 | |
| L18 — | COORDINATE INFORMATION | (X, Y, Z)··· | | COORDINATE INFORMATION | (X, Y, Z)··· | — L19 |
| | EXIT SIDE IDENTIFICATION INFORMATION | L19 | | EXIT SIDE IDENTIFICATION INFORMATION | ··· | |
| | ENTRY SIDE IDENTIFICATION INFORMATION | L17 | | ENTRY SIDE IDENTIFICATION INFORMATION | L18 | |
| | IDENTIFICATION INFORMATION | L111 | | IDENTIFICATION INFORMATION | L112 | |
| L111 — | COORDINATE INFORMATION | (X, Y, Z)··· | | COORDINATE INFORMATION | (X, Y, Z)··· | — L112 |
| | EXIT SIDE IDENTIFICATION INFORMATION | L112 | | EXIT SIDE IDENTIFICATION INFORMATION | L113 | |
| | ENTRY SIDE IDENTIFICATION INFORMATION | L10 | | ENTRY SIDE IDENTIFICATION INFORMATION | L111 | |
| | IDENTIFICATION INFORMATION | L113 | | | | |
| L113 — | COORDINATE INFORMATION | (X, Y, Z)··· | | | | |
| | EXIT SIDE IDENTIFICATION INFORMATION | L14 | | | | |
| | ENTRY SIDE IDENTIFICATION INFORMATION | L112 | | | | |

FIG. 5

ATTRIBUTE DATA 33

| | | | | | |
|---|---|---|---|---|---|
| AL10 | IDENTIFICATION INFORMATION | L10 | IDENTIFICATION INFORMATION | L11 | AL11 |
| | LANE TYPE INFORMATION | TRAVEL LANE | LANE TYPE INFORMATION | TRAVEL LANE | |
| | FORK/MERGE TYPE INFORMATION | NO CHANGE | FORK/MERGE TYPE INFORMATION | NO CHANGE | |
| AL12 | IDENTIFICATION INFORMATION | L12 | IDENTIFICATION INFORMATION | L13 | AL13 |
| | LANE TYPE INFORMATION | TRAVEL LANE | LANE TYPE INFORMATION | TRAVEL LANE | |
| | FORK/MERGE TYPE INFORMATION | NO CHANGE | FORK/MERGE TYPE INFORMATION | NO CHANGE | |
| AL14 | IDENTIFICATION INFORMATION | L14 | IDENTIFICATION INFORMATION | L15 | AL15 |
| | LANE TYPE INFORMATION | TRAVEL LANE | LANE TYPE INFORMATION | TRAVEL LANE | |
| | FORK/MERGE TYPE INFORMATION | NO CHANGE | FORK/MERGE TYPE INFORMATION | NO CHANGE | |
| AL16 | IDENTIFICATION INFORMATION | L16 | IDENTIFICATION INFORMATION | L17 | AL17 |
| | LANE TYPE INFORMATION | TRAVEL LANE | LANE TYPE INFORMATION | TRAVEL LANE | |
| | FORK/MERGE TYPE INFORMATION | NO CHANGE | FORK/MERGE TYPE INFORMATION | NO CHANGE | |

| | | | | | |
|---|---|---|---|---|---|
| AL18 | IDENTIFICATION INFORMATION | L18 | IDENTIFICATION INFORMATION | L19 | AL19 |
| | LANE TYPE INFORMATION | TRAVEL LANE | LANE TYPE INFORMATION | TRAVEL LANE | |
| | FORK/MERGE TYPE INFORMATION | NO CHANGE | FORK/MERGE TYPE INFORMATION | NO CHANGE | |
| AL111 | IDENTIFICATION INFORMATION | L111 | IDENTIFICATION INFORMATION | L112 | AL112 |
| | LANE TYPE INFORMATION | TRAVEL LANE | LANE TYPE INFORMATION | TRAVEL LANE | |
| | FORK/MERGE TYPE INFORMATION | INCREASE | FORK/MERGE TYPE INFORMATION | NO CHANGE | |
| AL113 | IDENTIFICATION INFORMATION | L113 | | | |
| | LANE TYPE INFORMATION | TRAVEL LANE | | | |
| | FORK/MERGE TYPE INFORMATION | DECREASE | | | |

FIG. 8

LANE NETWORK DATA    31

| | IDENTIFICATION INFORMATION | L20 | IDENTIFICATION INFORMATION | L21 | |
|---|---|---|---|---|---|
| L20 | COORDINATE INFORMATION | (X, Y, Z)··· | COORDINATE INFORMATION | (X, Y, Z)··· | L21 |
| | EXIT SIDE IDENTIFICATION INFORMATION | L21, L211 | EXIT SIDE IDENTIFICATION INFORMATION | L22 | |
| | ENTRY SIDE IDENTIFICATION INFORMATION | ··· | ENTRY SIDE IDENTIFICATION INFORMATION | L20 | |
| | IDENTIFICATION INFORMATION | L22 | IDENTIFICATION INFORMATION | L23 | |
| L22 | COORDINATE INFORMATION | (X, Y, Z)··· | COORDINATE INFORMATION | (X, Y, Z)··· | L23 |
| | EXIT SIDE IDENTIFICATION INFORMATION | L23 | EXIT SIDE IDENTIFICATION INFORMATION | L24 | |
| | ENTRY SIDE IDENTIFICATION INFORMATION | L21 | ENTRY SIDE IDENTIFICATION INFORMATION | L22 | |
| | IDENTIFICATION INFORMATION | L24 | IDENTIFICATION INFORMATION | L25 | |
| L24 | COORDINATE INFORMATION | (X, Y, Z)··· | COORDINATE INFORMATION | (X, Y, Z)··· | L25 |
| | EXIT SIDE IDENTIFICATION INFORMATION | ··· | EXIT SIDE IDENTIFICATION INFORMATION | L26 | |
| | ENTRY SIDE IDENTIFICATION INFORMATION | L23, L213 | ENTRY SIDE IDENTIFICATION INFORMATION | ··· | |

| | | | | | |
|---|---|---|---|---|---|
| L26 → | IDENTIFICATION INFORMATION | L26 | | IDENTIFICATION INFORMATION | L27 |
| | COORDINATE INFORMATION | (X, Y, Z)... | | COORDINATE INFORMATION | (X, Y, Z)... ← L27 |
| | EXIT SIDE IDENTIFICATION INFORMATION | L27 | | EXIT SIDE IDENTIFICATION INFORMATION | L28 |
| | ENTRY SIDE IDENTIFICATION INFORMATION | L25 | | ENTRY SIDE IDENTIFICATION INFORMATION | L26 |
| L28 → | IDENTIFICATION INFORMATION | L28 | | IDENTIFICATION INFORMATION | L29 |
| | COORDINATE INFORMATION | (X, Y, Z)... | | COORDINATE INFORMATION | (X, Y, Z)... ← L29 |
| | EXIT SIDE IDENTIFICATION INFORMATION | L29 | | EXIT SIDE IDENTIFICATION INFORMATION | ... |
| | ENTRY SIDE IDENTIFICATION INFORMATION | L27 | | ENTRY SIDE IDENTIFICATION INFORMATION | L28 |
| L211 → | IDENTIFICATION INFORMATION | L211 | | IDENTIFICATION INFORMATION | L212 |
| | COORDINATE INFORMATION | (X, Y, Z)... | | COORDINATE INFORMATION | (X, Y, Z)... ← L212 |
| | EXIT SIDE IDENTIFICATION INFORMATION | L212 | | EXIT SIDE IDENTIFICATION INFORMATION | L213 |
| | ENTRY SIDE IDENTIFICATION INFORMATION | L20 | | ENTRY SIDE IDENTIFICATION INFORMATION | L211 |
| L213 → | IDENTIFICATION INFORMATION | L213 | | | |
| | COORDINATE INFORMATION | (X, Y, Z)... | | | |
| | EXIT SIDE IDENTIFICATION INFORMATION | L24 | | | |
| | ENTRY SIDE IDENTIFICATION INFORMATION | L212 | | | |

FIG. 9

ATTRIBUTE DATA

| | | | 33 | | |
|---|---|---|---|---|---|
| AL20 | IDENTIFICATION INFORMATION | L20 | IDENTIFICATION INFORMATION | L21 | AL21 |
| | LANE TYPE INFORMATION | TRAVEL LANE | LANE TYPE INFORMATION | TRAVEL LANE | |
| | FORK/MERGE TYPE INFORMATION | NO CHANGE | FORK/MERGE TYPE INFORMATION | NO CHANGE | |
| AL22 | IDENTIFICATION INFORMATION | L22 | IDENTIFICATION INFORMATION | L23 | AL23 |
| | LANE TYPE INFORMATION | TRAVEL LANE | LANE TYPE INFORMATION | TRAVEL LANE | |
| | FORK/MERGE TYPE INFORMATION | NO CHANGE | FORK/MERGE TYPE INFORMATION | NO CHANGE | |
| AL24 | IDENTIFICATION INFORMATION | L24 | IDENTIFICATION INFORMATION | L25 | AL25 |
| | LANE TYPE INFORMATION | TRAVEL LANE | LANE TYPE INFORMATION | TRAVEL LANE | |
| | FORK/MERGE TYPE INFORMATION | NO CHANGE | FORK/MERGE TYPE INFORMATION | NO CHANGE | |
| AL26 | IDENTIFICATION INFORMATION | L26 | IDENTIFICATION INFORMATION | L27 | AL27 |
| | LANE TYPE INFORMATION | TRAVEL LANE | LANE TYPE INFORMATION | TRAVEL LANE | |
| | FORK/MERGE TYPE INFORMATION | NO CHANGE | FORK/MERGE TYPE INFORMATION | NO CHANGE | |

| | IDENTIFICATION INFORMATION | L28 | | IDENTIFICATION INFORMATION | L29 | |
|---|---|---|---|---|---|---|
| AL28 | LANE TYPE INFORMATION | TRAVEL LANE | | LANE TYPE INFORMATION | TRAVEL LANE | AL29 |
| | FORK/MERGE TYPE INFORMATION | NO CHANGE | | FORK/MERGE TYPE INFORMATION | NO CHANGE | |
| | IDENTIFICATION INFORMATION | L211 | | IDENTIFICATION INFORMATION | L212 | |
| AL211 | LANE TYPE INFORMATION | UPHILL LANE | | LANE TYPE INFORMATION | UPHILL LANE | AL212 |
| | FORK/MERGE TYPE INFORMATION | INCREASE | | FORK/MERGE TYPE INFORMATION | NO CHANGE | |
| | IDENTIFICATION INFORMATION | L213 | | | | |
| AL213 | LANE TYPE INFORMATION | UPHILL LANE | | | | |
| | FORK/MERGE TYPE INFORMATION | DECREASE | | | | |

*FIG. 12*

LANE NETWORK DATA 31

| | | | | | |
|---|---|---|---|---|---|
| L30 | IDENTIFICATION INFORMATION | L30 | IDENTIFICATION INFORMATION | L31 | |
| | COORDINATE INFORMATION | (X, Y, Z)... | COORDINATE INFORMATION | (X, Y, Z)... | L31 |
| | EXIT SIDE IDENTIFICATION INFORMATION | L31 | EXIT SIDE IDENTIFICATION INFORMATION | L32 | |
| | ENTRY SIDE IDENTIFICATION INFORMATION | ... | ENTRY SIDE IDENTIFICATION INFORMATION | L30 | |
| L32 | IDENTIFICATION INFORMATION | L32 | IDENTIFICATION INFORMATION | L33 | |
| | COORDINATE INFORMATION | (X, Y, Z)... | COORDINATE INFORMATION | (X, Y, Z)... | L33 |
| | EXIT SIDE IDENTIFICATION INFORMATION | L33 | EXIT SIDE IDENTIFICATION INFORMATION | L34 | |
| | ENTRY SIDE IDENTIFICATION INFORMATION | L31 | ENTRY SIDE IDENTIFICATION INFORMATION | L32, 312 | |
| L34 | IDENTIFICATION INFORMATION | L34 | | | |
| | COORDINATE INFORMATION | (X, Y, Z)... | | | |
| | EXIT SIDE IDENTIFICATION INFORMATION | ... | | | |
| | ENTRY SIDE IDENTIFICATION INFORMATION | L33 | | | |
| L311 | IDENTIFICATION INFORMATION | L311 | IDENTIFICATION INFORMATION | L312 | |
| | COORDINATE INFORMATION | (X, Y, Z)... | COORDINATE INFORMATION | (X, Y, Z)... | L312 |
| | EXIT SIDE IDENTIFICATION INFORMATION | L312 | EXIT SIDE IDENTIFICATION INFORMATION | L33 | |
| | ENTRY SIDE IDENTIFICATION INFORMATION | ... | ENTRY SIDE IDENTIFICATION INFORMATION | L311 | |

FIG. 13

ATTRIBUTE DATA 33

| | | | | | |
|---|---|---|---|---|---|
| AL30 | IDENTIFICATION INFORMATION | L30 | IDENTIFICATION INFORMATION | L31 | AL31 |
| | LANE TYPE INFORMATION | TRAVEL LANE | LANE TYPE INFORMATION | TRAVEL LANE | |
| | FORK/MERGE TYPE INFORMATION | NO CHANGE | FORK/MERGE TYPE INFORMATION | NO CHANGE | |
| AL32 | IDENTIFICATION INFORMATION | L32 | IDENTIFICATION INFORMATION | L33 | AL33 |
| | LANE TYPE INFORMATION | TRAVEL LANE | LANE TYPE INFORMATION | TRAVEL LANE | |
| | FORK/MERGE TYPE INFORMATION | NO CHANGE | FORK/MERGE TYPE INFORMATION | NO CHANGE | |
| AL34 | IDENTIFICATION INFORMATION | L34 | | | |
| | LANE TYPE INFORMATION | TRAVEL LANE | | | |
| | FORK/MERGE TYPE INFORMATION | NO CHANGE | | | |
| AL311 | IDENTIFICATION INFORMATION | L311 | IDENTIFICATION INFORMATION | L312 | AL312 |
| | LANE TYPE INFORMATION | TRAVEL LANE | LANE TYPE INFORMATION | TRAVEL LANE | |
| | FORK/MERGE TYPE INFORMATION | NO CHANGE | FORK/MERGE TYPE INFORMATION | MERGING | |

FIG. 16

FEATURE DATA 32

| | | | | | |
|---|---|---|---|---|---|
| BL10 | IDENTIFICATION INFORMATION | L51 | LANE SECTION IDENTIFICATION INFORMATION | L57 | BL11 |
| | ROAD BOUNDARY LINE IDENTIFICATION INFORMATION | BL10 | ROAD BOUNDARY LINE IDENTIFICATION INFORMATION | BL11 | |
| | ROAD BOUNDARY LINE COORDINATE INFORMATION | (X, Y, Z)··· | ROAD BOUNDARY LINE COORDINATE INFORMATION | (X, Y, Z)··· | |
| | BOUNDARY LINE IDENTIFICATION INFORMATION | 1 | BOUNDARY LINE IDENTIFICATION INFORMATION | 1 | |
| BL12 | LANE SECTION IDENTIFICATION INFORMATION | L53 | LANE SECTION IDENTIFICATION INFORMATION | L58 | BL13 |
| | ROAD BOUNDARY LINE IDENTIFICATION INFORMATION | BL12 | ROAD BOUNDARY LINE IDENTIFICATION INFORMATION | BL13 | |
| | ROAD BOUNDARY LINE COORDINATE INFORMATION | (X, Y, Z)··· | ROAD BOUNDARY LINE COORDINATE INFORMATION | (X, Y, Z)··· | |
| | BOUNDARY LINE IDENTIFICATION INFORMATION | 1 | BOUNDARY LINE IDENTIFICATION INFORMATION | 1 | |
| BL14 | LANE SECTION IDENTIFICATION INFORMATION | L508 | LANE SECTION IDENTIFICATION INFORMATION | L507 | BL15 |
| | ROAD BOUNDARY LINE IDENTIFICATION INFORMATION | BL14 | ROAD BOUNDARY LINE IDENTIFICATION INFORMATION | BL15 | |
| | ROAD BOUNDARY LINE COORDINATE INFORMATION | (X, Y, Z)··· | ROAD BOUNDARY LINE COORDINATE INFORMATION | (X, Y, Z)··· | |
| | BOUNDARY LINE IDENTIFICATION INFORMATION | 1 | BOUNDARY LINE IDENTIFICATION INFORMATION | 1 | |

| | | |
|---|---|---|
| BL16 | LANE SECTION IDENTIFICATION INFORMATION | L503 |
| | ROAD BOUNDARY LINE IDENTIFICATION INFORMATION | BL16 |
| | ROAD BOUNDARY LINE COORDINATE INFORMATION | (X, Y, Z)··· |
| | BOUNDARY LINE IDENTIFICATION INFORMATION | 1 |

*FIG. 19*

ATTRIBUTE DATA 33

| | | | | |
|---|---|---|---|---|
| AL611 → IDENTIFICATION INFORMATION | L611 | IDENTIFICATION INFORMATION | L612 | ← AL612 |
| LANE TYPE INFORMATION | TRAVEL LANE | LANE TYPE INFORMATION | TRAVEL LANE | |
| FORK/MERGE INFORMATION | MERGE | FORK/MERGE INFORMATION | MERGE | |
| LEFT LANE IDENTIFICATION INFORMATION | N/A | LEFT LANE IDENTIFICATION INFORMATION | N/A | |
| LEFT-LANE LANE CHANGE PERMISSION LEVEL | 1 | LEFT-LANE LANE CHANGE PERMISSION LEVEL | 1 | |
| RIGHT LANE IDENTIFICATION INFORMATION | L61 | RIGHT LANE IDENTIFICATION INFORMATION | L62 | |
| RIGHT-LANE LANE CHANGE PERMISSION LEVEL | 1 | RIGHT-LANE LANE CHANGE PERMISSION LEVEL | 2 | |
| AL613 → IDENTIFICATION INFORMATION | L613 | IDENTIFICATION INFORMATION | L614 | ← AL614 |
| LANE TYPE INFORMATION | TRAVEL LANE | LANE TYPE INFORMATION | TRAVEL LANE | |
| FORK/MERGE INFORMATION | MERGE | FORK/MERGE INFORMATION | MERGE | |
| LEFT LANE IDENTIFICATION INFORMATION | N/A | LEFT LANE IDENTIFICATION INFORMATION | N/A | |
| LEFT-LANE LANE CHANGE PERMISSION LEVEL | 1 | LEFT-LANE LANE CHANGE PERMISSION LEVEL | 1 | |
| RIGHT LANE IDENTIFICATION INFORMATION | L63 | RIGHT LANE IDENTIFICATION INFORMATION | L64 | |
| RIGHT-LANE LANE CHANGE PERMISSION LEVEL | 3 | RIGHT-LANE LANE CHANGE PERMISSION LEVEL | 4 | |

| IDENTIFICATION INFORMATION | L615 |
|---|---|
| LANE TYPE INFORMATION | TRAVEL LANE |
| FORK/MERGE INFORMATION | MERGE |
| LEFT LANE IDENTIFICATION INFORMATION | N/A |
| LEFT-LANE LANE CHANGE PERMISSION LEVEL | 1 |
| RIGHT LANE IDENTIFICATION INFORMATION | L65 |
| RIGHT-LANE LANE CHANGE PERMISSION LEVEL | 5 |

| LANE CHANGE PERMISSION LEVEL | |
|---|---|
| 1 | BOUNDARY LINE BETWEEN LANES AND BETWEEN LANES WITH DIFFERENT TRAVELING DIRECTION (NOT CHANGEABLE) |
| 2 | LEGAL REGULATIONS PRESENT AND PHYSICAL OBSTACLES PRESENT (NOT CHANGEABLE) |
| 3 | LEGAL REGULATIONS PRESENT (NOT CHANGEABLE) |
| 4 | NO LEGAL REGULATIONS BUT PHYSICAL OBSTACLES PRESENT (NOT CHANGEABLE) |
| 5 | NO LEGAL RESTRICTIONS (CHANGEALBE) |

FIG. 21

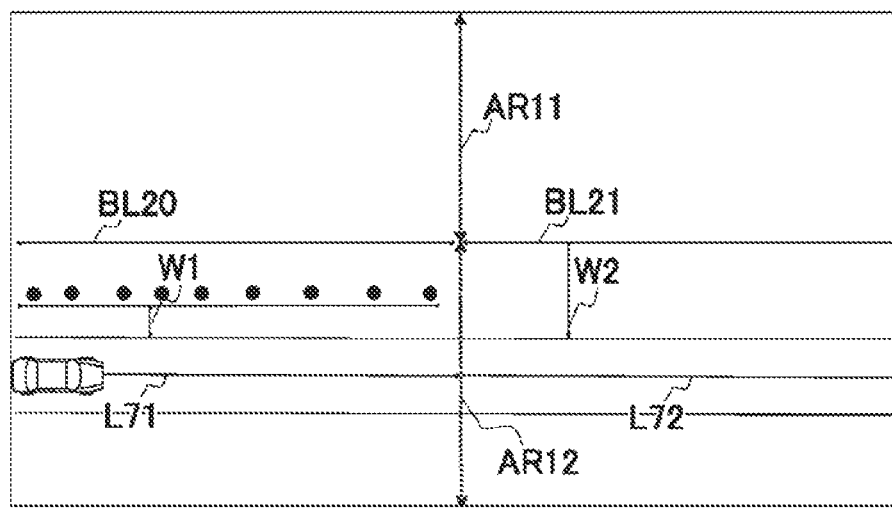

FIG. 22

| FEATURE DATA | 32 | | |
|---|---|---|---|
| BL20 | | BL21 | |
| IDENTIFICATION INFORMATION | L71 | IDENTIFICATION INFORMATION | L72 |
| ROAD BOUNDARY LINE IDENTIFICATION INFORMATION | BL20 | ROAD BOUNDARY LINE IDENTIFICATION INFORMATION | BL21 |
| ROAD BOUNDARY LINE COORDINATE INFORMATION | (X, Y, Z)··· | ROAD BOUNDARY LINE COORDINATE INFORMATION | (X, Y, Z)··· |
| ROAD BOUNDARY LINE POSITION INFORMATION | LEFT SIDE | ROAD BOUNDARY LINE POSITION INFORMATION | LEFT SIDE |
| LEFT ROAD SHOULDER WIDTH INFORMATION (m) | 1.5 | LEFT ROAD SHOULDER WIDTH INFORMATION (m) | 4.0 |
| RIGHT ROAD SHOULDER WIDTH INFORMATION (m) | - | RIGHT ROAD SHOULDER WIDTH INFORMATION (m) | - | ed
TRAVEL SUPPORT DEVICE AND NON-TRANSITORY COMPUTER-READABLE MEDIUM

CROSS-REFERENCE TO RELATED APPLICATIONS

This application is a continuation of International Application No. PCT/JP2018/006826, filed Feb. 23, 2018, which claims priority from Japanese Application No. 2017-087802, filed Apr. 27, 2017, the entire contents of each are incorporated herein by reference.

TECHNICAL FIELD

The present disclosure relates to a technology capable of supporting travel of a moving body.

BACKGROUND

In recent years, devices which accurately estimate the position of an own vehicle with precision and support travel of the vehicle have become popular. In this regard, a technique has been proposed in which direction guidance is performed in front of a road section where a lane is added and lane guidance is performed in the lane added section when it is determined that, on a road on which the lane is added corresponding to a road after course change, a vehicle travels on the road in front of a fork (Patent Literature 1).

CITATION LIST

Patent Literature

[Patent Literature 1]: JP-A-2009-204514

SUMMARY

The present disclosure provides a travel support device which supports travel of a vehicle, comprising: a memory that stores first section information regarding a first section included in a first lane constituting a part of a road, second section information regarding a second section adjacent to a front in a traveling direction of the first section, and third section information regarding a third section included in a second lane which is a lane constituting a part of the road, wherein the second lane is added to and splits off from the first lane, the second lane is adjacent to the first lane in a width direction of the road, the third section is a section adjacent to the second section in the width direction of the road, travel increase information is associated with the third section information in a case where the second lane is a lane which is added to and splits off from the first lane as a traveling lane, and uphill increase information is associated with the third section information in a case where the second lane is a lane which is added to and splits off from the first lane as an uphill lane; and processing circuitry configured to guide the vehicle from the first section to the third section based on the travel increase information associated with the third section information, regardless of whether the vehicle is a first vehicle or a second vehicle, guide the vehicle straight from the first section to the second section based on the uphill increase information associated with the third section information in response to determining that the vehicle is the first vehicle, and guide the vehicle from the first section to the third section based on the uphill increase information associated with the third section information in response to determining that the vehicle is the second vehicle.

BRIEF DESCRIPTION OF DRAWINGS

FIG. 2 is a diagram for illustrating a concept of map data according to the first embodiment.
FIG. 4 is a diagram for illustrating details of map data according to the first embodiment.
FIG. 5 is a diagram for illustrating the details of the map data according to the first embodiment.
FIG. 8 is a diagram for illustrating the details of the map data according to the first embodiment.
FIG. 9 is a diagram for illustrating the details of the map data according to the first embodiment.
FIG. 12 is a diagram for illustrating details of map data according to the second embodiment.
FIG. 13 is a diagram for illustrating the details of the map data according to the second embodiment;
FIG. 16 is a diagram for illustrating details of map data according to the third embodiment.
FIG. 19 is a diagram for illustrating a data structure of map data 20 according to the first modification example.
FIG. 21 is a diagram for illustrating the concept of a travel support process according to a second modification example.
FIG. 22 is a diagram for illustrating a data structure of map data 20 according to the second modification example.

DETAILED DESCRIPTION

Technical Problem

Figure 1:
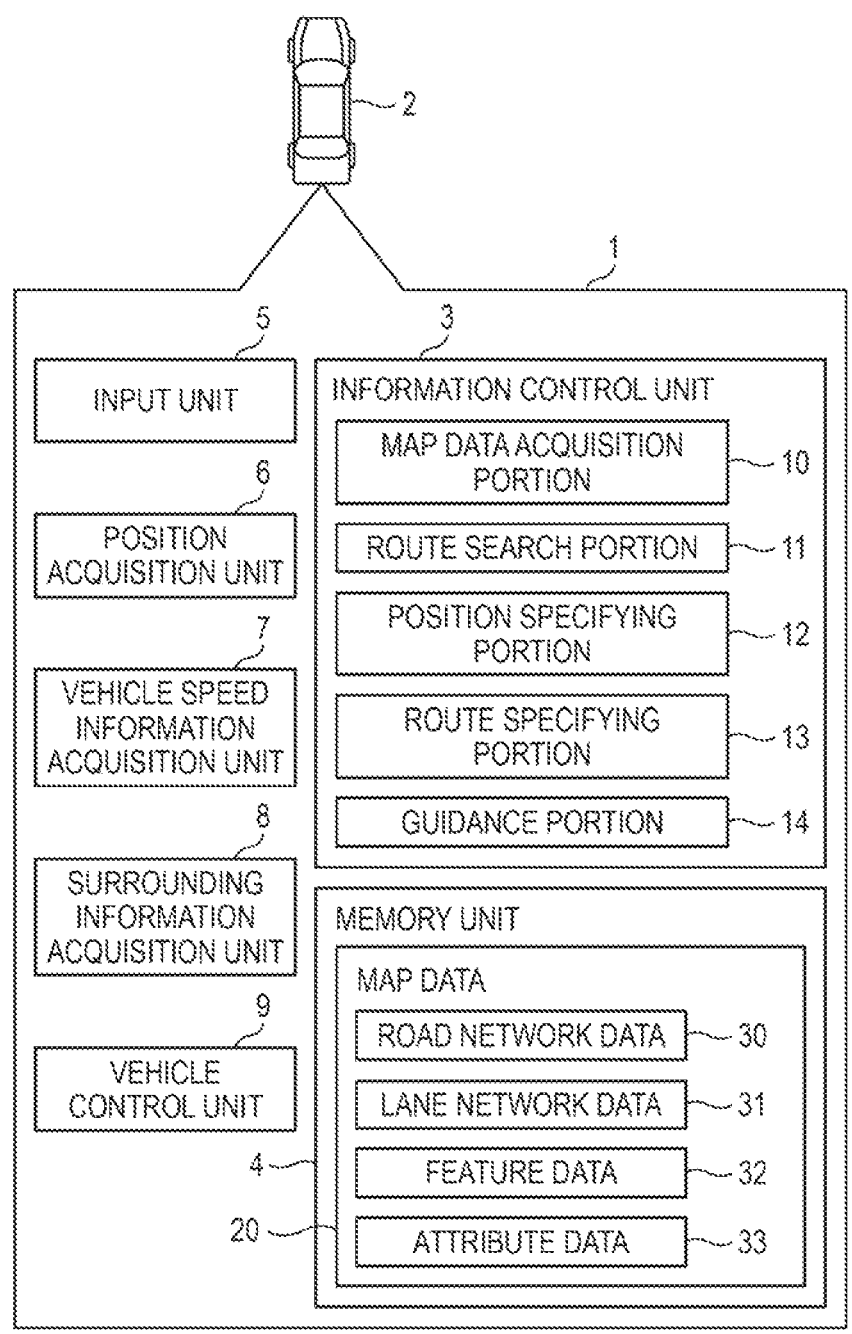
FIG. 1 is a diagram for illustrating a configuration of a driving support device according to a first embodiment.

An object of the disclosure is to provide a travel support device capable of appropriately guide-controlling a moving body and a data structure of map data used in the travel support device.

Solution to Problem (1) As an aspect of the disclosure, a travel support device which supports travel of a vehicle, includes a memory that stores first section information regarding a first section included in a first lane constituting a part of a road, second section information regarding a second section adjacent to a front in a traveling direction of the first section, and third section information regarding a third section included in a second lane which is a lane constituting a part of the road, wherein the second lane is added to and splits off from the first lane, the second lane is adjacent to the first lane in a width direction of the road, the third section is a section adjacent to the second section in the width direction of the road, travel increase information is associated with the third section information in a case where the second lane is a lane which is added to and splits off from the first lane as a traveling lane, and uphill increase information is associated with the third section information in a case where the second lane is a lane which is added to and splits off from the first lane as an uphill lane; and processing circuitry configured to guide the vehicle from the first section to the third section based on the travel increase information associated with the third section information, regardless of whether the vehicle is a first vehicle or a second vehicle, guide the vehicle straight from the first section to the second section based on the uphill increase information associated with the third section information in response to determining that the vehicle is the first vehicle, and guide the vehicle from the first section to the third section based on the uphill increase information associated with the third section information in response to determining that the vehicle is the second vehicle.

(2) As another aspect, the travel support device according to (1), wherein the processing circuitry is configured to guide the vehicle by performing a drive assist.

(3) As still another aspect, the travel support device according to (1), wherein the processing circuitry is configured to determine whether the vehicle is the first vehicle or the second vehicle.

(4) As still another aspect, the travel support device according to (1), wherein the processing circuitry is configured to determine whether the vehicle is the first vehicle or the second vehicle using identification information of the vehicle.

(5) As still another aspect, the travel support device according to (4), wherein the identification information of the vehicle indicates a size of the vehicle.

(6) As still another aspect, the travel support device according to (1), wherein the processing circuitry is configured to: acquire speed information of the vehicle; and determine whether the vehicle is the first vehicle or the second vehicle using the acquired speed information.

(7) As still another aspect, the travel support device according to (1), wherein the memory stores fourth section information regarding a fourth section included in a third lane constituting a part of the road, the fourth section information is associated with at least one of merge information or decrease information, the merge information is associated with the fourth section information in a case where the third lane is a lane which merges with another lane, and the decrease information is associated with the fourth section information in a case where the third lane is a decreasing lane.

(8) As still another aspect, the travel support device according to (7), wherein the processing circuitry is configured to control the vehicle in view of another vehicle traveling in a lane, which is a merging target or a decreasing target, based on either the merge information or the decrease information associated with the fourth section information.

(9) As still another aspect, the travel support device according to (8), wherein the processing circuitry is configured to control the vehicle to avoid collision with the another vehicle.

(10) As an aspect of the disclosure, a non-transitory computer-readable medium having encoded thereon a data structure of map data, the data structure includes: first section information regarding a first section included in a first lane constituting a part of a road; second section information regarding a second section adjacent to a front in a traveling direction of the first section; and third section information corresponding to a third section included in a second lane which is a lane constituting a part of the road, wherein the second lane is added to and splits off from the first lane, the second lane is adjacent to the first lane in a width direction of the road, the third section is a section adjacent to the second section in the width direction of the road, travel increase information is associated with the third section information in a case where the second lane is a lane which is added to and splits off from the first lane as a traveling lane, and uphill increase information is associated with the third section information in a case where the second lane is a lane which is added to and splits off from the first lane as an uphill lane, wherein the travel increase information associated with the third section information is used to guide a vehicle from the first section to the third section, and the uphill increase information associated with the third section information is used to guide the vehicle either straight from the first section to the second section, or from the first section to the third section depending on whether the vehicle is a first vehicle or a second vehicle.

(11) As another aspect, the non-transitory computer-readable medium according to (10), wherein the travel increase information associated with the third section information is used to guide the vehicle from the first section to the third section, regardless of whether the vehicle is the first vehicle or the second vehicle.

(12) As still another aspect, the non-transitory computer-readable medium according to (10), wherein the uphill increase information associated with the third section information is used to guide the vehicle either straight from the first section to the second section in a case where the vehicle is the first vehicle.

(13) As still another aspect, the non-transitory computer-readable medium according to (10), wherein the uphill increase information associated with the third section information is used to guide the vehicle from the first section to the third section in a case where the vehicle is the second vehicle.

(14) As still another aspect, the non-transitory computer-readable medium according to (10), wherein the vehicle is guided by performing a drive assist.

(15) As still another aspect, the non-transitory computer-readable medium according to (10), wherein the vehicle is determined to be either the first vehicle or the second vehicle using identification information of the vehicle.

(16) As still another aspect, the non-transitory computer-readable medium according to (15), wherein the identification information of the vehicle indicates a size of the vehicle.

(17) As still another aspect, the non-transitory computer-readable medium according to (10), wherein the vehicle is determined to be either the first vehicle or the second vehicle using speed information of the vehicle.

(18) As still another aspect, the non-transitory computer-readable medium according to (10), wherein the data structure further comprises fourth section information regarding a fourth section included in a third lane constituting a part of the road, the fourth section information is associated with at least one of merge information or decrease information, the merge information is associated with the fourth section information in a case where the third lane is a lane which merges with another lane, the decrease information is associated with the fourth section information in a case where the third lane is a decreasing lane.

(19) As still another aspect, the non-transitory computer-readable medium according to (18), wherein either the merge information or the decrease information associated with the fourth section information is used to control the vehicle in view of another vehicle traveling in a lane, which is a merging target or a decreasing target.

(20) As an aspect of the disclosure, a travel support device which supports travel of a vehicle, includes: a memory that stores boundary line information of a boundary between a first area constituting a part of a road and a second area constituting a part of the road and adjacent to the first area in a width direction of the road, the boundary being physically passable but defining a virtual boundary between the first area and the second area; and processing circuitry configured to prohibit a vehicle passing through the first area from passing to a side of the second area based on the boundary line information.

(21) As an aspect of the disclosure, a travel support device which supports travel of a vehicle includes: a map data memory unit which has first section information corresponding to a first section included in a first lane constituting a part of a road; second section information corresponding to a second section adjacent to a front in a traveling direction of the first section; and third section information corresponding to a third section included in a second lane which is a lane constituting a part of the road, which is added to the first lane and which is adjacent to the first lane in a width direction of the road, the third section is a section adjacent to the second section in the width direction of the road, travel increase information is associated with the third section information when the second lane is a lane added to the first lane as a traveling lane and uphill increase information is associated with the third section information when the second lane is a lane added to the first lane as an uphill lane, and the travel support device further includes a control unit which guides the vehicle from the first section to the third section based on the travel increase information associated with the third section information, regardless of whether the vehicle is a first vehicle or a second vehicle, which guides the vehicle straight from the first section to the second section based on the uphill increase information associated with the third section information when the vehicle is the first vehicle, and which guides the vehicle from the first section to the third section based on the uphill increase information associated with the third section information when the vehicle is the second vehicle.

(22) As another aspect, in a travel support device of (21), the map data memory unit has fourth section information corresponding to a fourth section included in a third lane constituting a part of the road, and the fourth section information is associated with at least one of merge information or decrease information, and the merge information is associated with the fourth section information when the third lane is a lane which merges with another lane, and the decrease information is associated with the fourth section information when the third lane is a decreasing lane, and the control unit controls the vehicle to pay attention to another vehicle traveling in a lane, which is a merging target or a decreasing target, based on either the merge information or the decrease information associated with the fourth section information.

(23) As still another aspect, a data structure of map data is used in a computer including a map data memory unit and having a control unit which performs a process for guidance control of a vehicle, the map data is stored in the map data memory unit, the map data has: first section information corresponding to a first section included in a first lane constituting a part of a road; second section information corresponding to a second section adjacent to a front in a traveling direction of the first section; and third section information corresponding to a third section included in a second lane, which is a lane constituting a part of the road, which is added to the first lane and which is adjacent to the first lane in a width direction of the road, the third section is a section adjacent to the second section in the width direction of the road, and travel increase information in the third section is associated with the third section information when the second lane is a lane added to the first lane as a traveling lane and uphill increase information is associated with the third section information when the second lane is a lane added to the first lane as an uphill lane, and an association of the third section information with the travel increase information or the uphill increase information is used in a process in which the control unit acquires the travel increase information or the uphill increase information associated with the third section information from the map data memory unit.

(24) As still another aspect, a travel support device for supporting travel of a vehicle includes a map data memory unit which has boundary line information of a boundary between a first area constituting a part of a road and a second area constituting a part of the road and adjacent to the first area in a width direction of the road, the boundary is physically passable but defines a boundary between the first area and the second area, and a control unit which prohibits a vehicle passing through the first area from passing to a side of the second area based on the boundary line information.

(25) As still another aspect, in a travel support device of (24), the control unit allows the vehicle passing through the first area to pass to the side of the second area based on the boundary line information.

(26) As still another aspect, a data structure of map data is used in a computer including a map data memory unit and having a control unit which performs a process for guidance control of a vehicle, the map data is stored in the map data memory unit, the map data has: boundary line information of a boundary between a first area constituting a part of a road and a second area constituting a part of the road and adjacent to the first area in a width direction of the road, the boundary is physically passable but defines a boundary between the first area and the second area, and travel line information indicating a traveling line for a vehicle to travel within the first area, and the travel line information is associated with the boundary line information and an association of the travel line information with the boundary line information is used in a process in which the control unit acquires the boundary line information associated with the travel line information from the map data memory unit.

FIG. 1 is a diagram for illustrating a travel support system 1 in a first embodiment which is an example of a travel support device. The travel support system 1 is mounted on a vehicle 2 which is a moving body and includes an information control unit 3, a memory unit 4, an input unit 5, a position acquisition unit 6, a vehicle speed information acquisition unit 7, a surrounding information acquisition unit 8, and a vehicle control unit 9. The information control unit 3 includes functional portions for realizing predetermined functions such as a map data acquisition portion 10, a route search portion 11, a position specifying portion 12, a route specifying portion 13, and a guidance portion 14 and includes a central processing unit (CPU), a read only memory (ROM), and a random access memory (RAM), which are not illustrated. The CPU of the information control unit 3 reads out various programs stored in the ROM, develops the programs in the RAM, and executes the programs to realize functions related to the various programs. The functional portions such as the map data acquisition portion 10, the route search portion 11, the position specifying portion 12, the route specifying portion 13, and the guidance portion 14 are functions realized by the programs.

The memory unit 4 is configured of a mass storage medium such as a hard disk or an SD-RAM. The memory unit 4 stores map data 20 used for route search processing, position specifying of the vehicle, vehicle guidance control, and the like. The map data 20 includes road network data 30, lane network data 31, feature data 32, and attribute data 33.

The road network data 30 has a plurality of pieces of the location information including intersection points and fork points of a road and a plurality of pieces of the road section information including information on a predetermined section of the road and is information indicating a road connection by the plurality of pieces of the location information and the plurality of pieces of the road section information. The lane network data 31 includes identification information to identify the lane section information, coordinate information indicating a series of coordinate points of the lane centerline corresponding to the lane section information, exit side identification information which is identification information of the lane section information corresponding to a section on the exit side of the section corresponding to the lane section information, entry side identification information corresponding to a section on the entry side of the section corresponding to the lane section, and the like. The feature data 32 includes boundary information and the like indicating road boundaries. The attribute data 33 includes related information for associating the road section information of the road network data 30 with the lane section information of the lane network data 31 and lane attribute information. The details of the lane attribute information and the boundary line information will be described below.

The input unit 5 receives an instruction input for route setting and vehicle guidance from a user. The position acquisition unit 6 acquires position information on the position of the vehicle including latitude and longitude based on radio waves received from satellites constituting the Global Positioning System (GPS) and signals from gyros provided to the vehicle. The vehicle speed information acquisition unit 7 acquires information on the speed of the vehicle based on the pulse signal acquired from a vehicle speed sensor. The surrounding information acquisition unit 8 acquires surrounding information of the vehicle, which is image information of an object such as a sign around the vehicle and a road marking paint (for example, edge line).

The map data acquisition portion 10 extracts the desired map data 20 stored in the memory unit 4 in response to the map data acquisition request. The route search portion 11 executes a route search process using the road network data 30 stored in the memory unit 4. Specifically, the route search portion 11 uses the road section information and the location information included in the road network data 30 to execute a route search process from a departure point to a destination point. Then, route information indicating a route (a plurality of pieces of location information and a plurality of pieces of road section information connecting the departure point to the destination point) from the departure point to the destination point is created by the route search process.

As a route search method, a well-known method such as Dijkstra's method is adopted and the shortest route from the departure point to the destination point is searched using the cost information included in the road section information. The position specifying portion 12 specifies which position on the road the position of the vehicle is from the position information obtained by the position acquisition unit 6 and specifies which position on the road the position of the vehicle is from the surrounding information obtained by the feature data 32 and the surrounding information acquisition unit 8 in addition to the position information obtained by the position acquisition unit 6.

The route specifying portion 13 performs a process for specifying a route to the lane network data 31 by the related information using the route information of the road network data 30 created by the route search portion 11. The first to third embodiments described below are an example in which the vehicle travels the route specified in the lane network data 31 by the route specifying portion 13.

The guidance portion 14 generates guidance information for controlling the vehicle so that the vehicle control unit 9 moves the vehicle along a predetermined lane of the road and outputs the guidance information to the vehicle control unit 9. The vehicle control unit 9 controls (steering, acceleration and deceleration, stop, and the like) the vehicle to move along a predetermined lane of the road based on the guidance information.

Further, the travel support system 1 may be configured such that the information control unit 3 and the memory unit 4 are not installed in the vehicle 2 but installed in a server and the information control unit 3 in the server receives information of the input unit 5, the position acquisition unit 6, the vehicle speed information acquisition unit 7, and the surrounding information acquisition unit 8 as communication information and outputs the guidance information to the vehicle control unit 9 as communication information. In addition, the travel support system 1 may be configured such that the memory unit 4 is not installed in the vehicle 2 but installed in the server and the information control unit 3 in the vehicle acquires and receives the desired map data 20 stored in the memory unit 4 according to the communication information in response to the map data acquisition request.

FIG. 2 is a diagram for illustrating a concept of map data according to the first embodiment and the second embodiment. The attribute data 33 is a conceptual view of a data structure included in the map data 20 and includes lane type information and fork/merge information. The lane type is information on the type of the section of the lane and is any one of a traveling lane, an overtaking lane, an uphill lane, a crawling lane, an acceleration lane, and a deceleration lane. The fork/merge type information is information on the type of fork and merge of a section of a lane and is any of no change, fork, merge, increase, and decrease.

First Embodiment

A travel support process using the travel support system of the first embodiment will be described using FIGS. 3 to 6.

Figure 3:
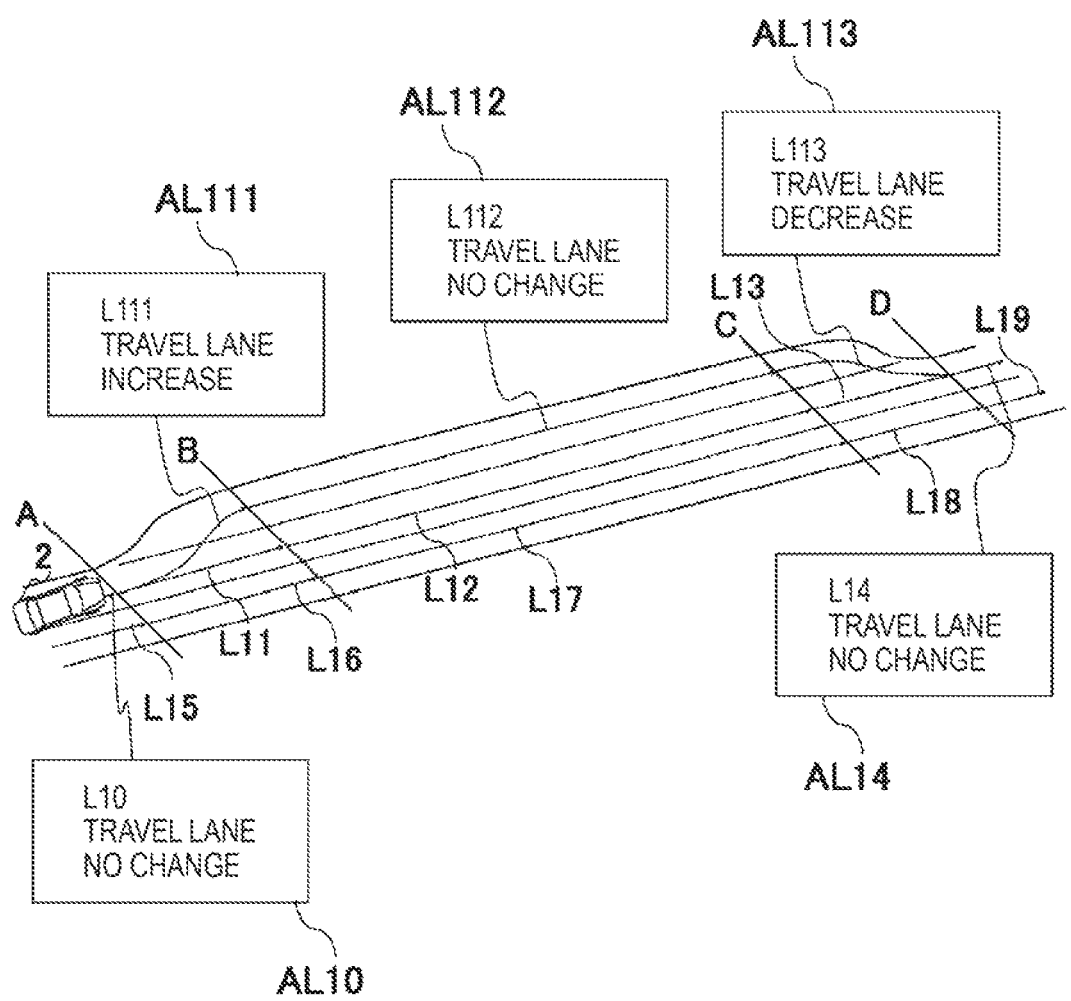
FIG. 3 is a diagram for illustrating the concept of a travel support process according to the first embodiment.

FIG. 3 is a diagram for illustrating a concept of the map data 20 according to the first embodiment. That is, FIG. 3 illustrates an actual road and a data structure of the road. A section to A, a section from A to B, a section from B to C, a section from C to D, and a section after D of the map data 20 respectively correspond to a section to A, a section from A to B, a section from B to C, a section from C to D, and a section after D of an actual road.

The map data 20 has lane section information L10 to L113 included in the lane network data 31 and lane attribute information AL10 to AL113 included in the attribute data 33 and each lane attribute information includes lane type information on the type of the lane in the section corresponding to lane section information L10 to L113 and fork/merge type information on the type of fork and merge. For example, the lane type information "travel lane" and fork/merge information "increase" of the section related to the lane section information L111 are included.

FIG. 4 is a diagram for illustrating details of the map data 20 of the first embodiment. Each of pieces of the lane section information L10 to L113 included in the lane network data 31 includes identification information to identify the lane section information, coordinate information indicating a series of coordinate points of the centerline of the lane corresponding to the lane section information L10 to L113, exit side identification information which is the identification information of the lane section information corresponding to a section on the exit side of the section corresponding to the lane section information L10 to L113, entry side identification information which is identification information of the lane section information corresponding to a section on the entry side of the section corresponding to the lane section information L10 to L113, and the like. Also, the connection between the front and the rear of the lane is indicated by the exit side identification information and the entry side identification information. The lane section information L10 is an example of first section information corresponding to a first section included in a first lane which constitutes a part of a road and the lane section information L11 is an example of second section information corresponding to a second section adjacent to the front in a traveling direction of the first section, and further, the lane section information L111 is an example of third section information corresponding to a third section included in a second lane which is a lane constituting a part of the road and added to a first lane and adjacent to the first lane in a width direction of the road. The third section is a section adjacent to the second section in the width direction of the road.

FIG. 5 is a diagram for illustrating details of the map data 20 of the first embodiment. Each of pieces of the lane attribute information AL10 to AL113 of the attribute data 33 includes identification information of lane section information to identify the section corresponding to the lane section information L10 to L113, lane type information on the type of lane, and fork/merge type information on the type of fork and merge. When the second lane is a lane which added to a first lane as a travel lane, the identification information of the lane section information L111, the lane type information "travel lane", and the fork/merge type information "increase" are an example in which travel increase information is associated with the third section information.

Figure 6:
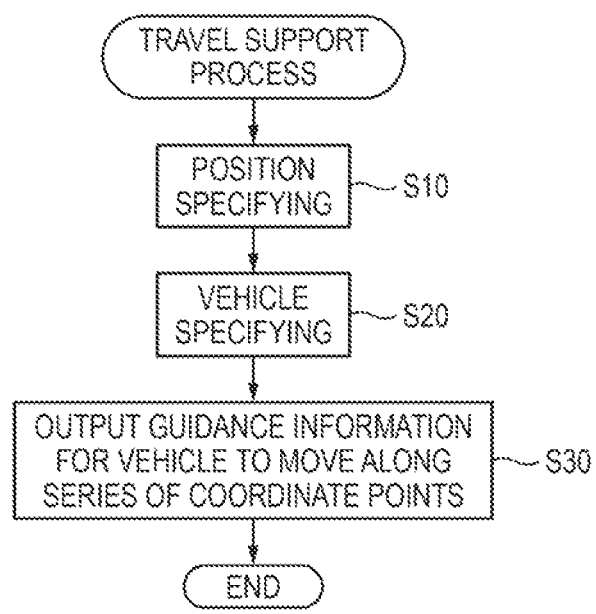
FIG. 6 is a diagram for illustrating an operation flow of the travel support process according to the first embodiment.

FIG. 6 is a diagram for illustrating an operation flow of a travel support process of the first embodiment. The information control unit 3 performs a position specifying process to specify a current location of the vehicle, vehicle specifying process to specify the vehicle, and a guidance process to control the travel of the vehicle using the information on the current location specified in the position specifying process, the lane network data 31, and the attribute data 33.

The position specifying process, the vehicle specifying process, and the guidance process will be specifically described below.

The information control unit 3 (position specifying portion 12) performs the following process as the position specifying process.

From the current location information acquired by the position acquisition unit 6, the coordinates of the current location of the vehicle are calculated. It may be configured such that the coordinates of the current location of the vehicle is calculated by using surrounding image information of a vehicle such as an edge line of an actual road acquired by the surrounding information acquisition unit 8, feature data 32 such as edge line information (not illustrated) stored in the memory unit 4, and the like (Step S10).

The information control unit 3 performs the following process as the vehicle specifying process.

Identification information for identifying vehicle types such as a large vehicle, an ordinary vehicle, and a light vehicle is acquired from the vehicle and whether the vehicle is a large vehicle, an ordinary vehicle, or a light vehicle is specified. Also, based on the vehicle speed information acquired by the vehicle speed information acquisition unit 7, it may be specified whether the vehicle is a high-speed vehicle or a low-speed vehicle. In addition, it may be configured such that whether the vehicle is a large vehicle, an ordinary vehicle, or a light vehicle is specified based on the identification information input by a driver of the vehicle to the input unit 5 and it may be configured such that whether the vehicle is a high-speed vehicle or a low-speed vehicle is specified based on the vehicle speed information input by a driver of the vehicle to the input unit 5 (Step S20).

The information control unit 3 (map data acquisition portion 10, guidance portion 14) performs the following process as the guidance process.

The lane section information L10 which has the information of the coordinates closest to the coordinates of the current location calculated by the position specifying process is specified and the coordinate information of the current location is compared with the information of the series of the coordinate points included in the lane section information L10, and further guidance information for the vehicle to move along the series of coordinate points is generated, and then the guidance information is output to the vehicle control unit 9. Further, based on the identification information L111 of the lane section information included in the lane attribute information AL111 which is an association of the lane type information "travel lane" with the fork/merge information "increase" of the section corresponding to the lane section information L111, the map data acquisition portion 10 acquires the lane type information "travel lane" and the fork/merge type information "increase" related to the lane section information L111 from the memory unit 4. This process is an example of a process in which the control unit acquires travel increase information related to the third section information from the map data memory unit.

The guidance information to move the vehicle along the series of the coordinate points of the lane section information L10 is generated, and then the guidance information to move the vehicle along the series of the coordinate points of the lane section information L111 is generated based on the information of the vehicle specified in the vehicle specifying process and the lane type information and the fork/merge type information of the section corresponding to the lane section information L111. More specifically, when the lane type information and the fork/merge information of the section corresponding to the acquired lane section information L111 are lane type information "travel lane" and fork/merge information "increase", regardless of the vehicle specified in the vehicle specifying process, the guidance information to move the vehicle along the series of the coordinate points of the lane section information L111 from the series of the coordinate points of the lane section information L10 is generated and the guidance information is output to the vehicle control unit 9. The process described above is an example of guiding the vehicle from the first section to the third section based on the travel increase information associated with the third section information regardless of whether the vehicle is the first vehicle or the second vehicle (Step S30).

Next, another example of the travel support process using the travel support system of the first embodiment will be described with reference to FIGS. 7 to 10.

Figure 7:
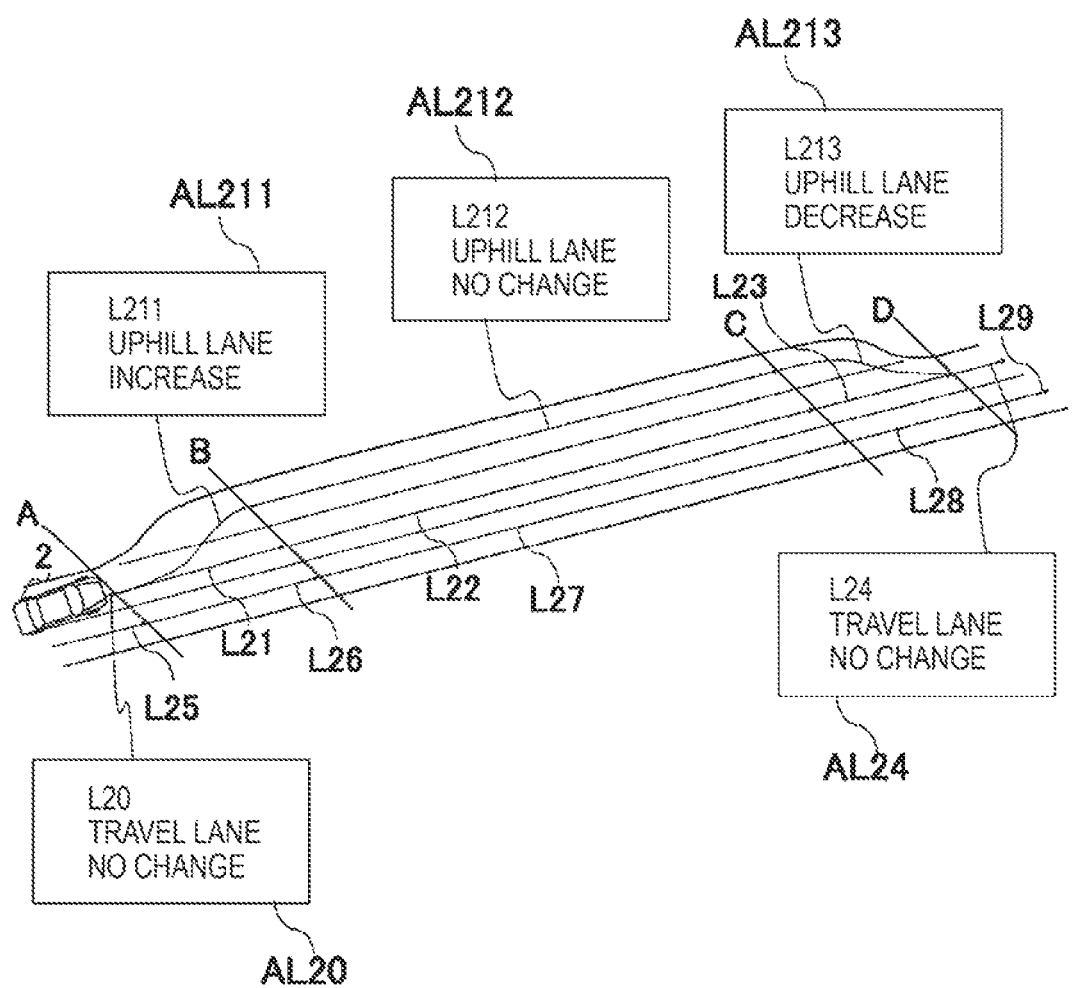
FIG. 7 is a diagram for illustrating the concept of the travel support process according to the first embodiment.

FIG. 7 is a diagram for illustrating a concept of the map data 20 of the first embodiment. That is, FIG. 7 illustrates an actual road and a data structure of the road. A section to A, a section from A to B, a section from B to C, a section from C to D, and a section after D of the map data 20 respectively correspond to a section to A, a section from A to B, a section from B to C, a section from C to D, and a section after D of the actual road. The map data 20 has lane section information L20 to L213 included in the lane network data 31 and lane attribute information AL20 to AL213 included in the attribute data 33 and each of pieces of the lane attribute information AL20 to AL213 includes lane type information on the type of the lane of the section corresponding to the lane section information L20 to L213 and fork/merge type information on the type of fork and merge. For example, the section corresponding to the lane section information L211 includes the lane type information "uphill lane" and the fork/merge information "increase".

FIG. 8 is a diagram for illustrating details of the map data 20 of the first embodiment. Each of pieces of the lane section information L20 to L213 included in the lane network data 31 includes identification information to identify the lane section information, coordinate information indicating a series of coordinate points of the centerline of the lane corresponding to the lane section information L20 to L213, exit side identification information which is the identification information of the lane section information corresponding to a section on the exit side of the section corresponding to the lane section information L20 to L213, entry side identification information which is identification information of the lane section information corresponding to a section on the entry side of the section corresponding to the lane section information L20 to L213, and the like. The connection between the front and the rear of the lane is indicated by the exit side identification information and the entry side identification information. The lane section information L20 is an example of first section information corresponding to a first section included in a first lane which constitutes a part of a road and the lane section information L21 is an example of second section information corresponding to a second section adjacent to the front in a traveling direction of the first section, and further, the lane section information L211 is an example of third section information corresponding to a third section included in a second lane which is a lane constituting a part of the road and added to a first lane and adjacent to the first lane in a width direction of the road. The third section is a section adjacent to the second section in the width direction of the road.

FIG. 9 is a diagram for illustrating details of the map data 20 of the first embodiment. Each of pieces of the lane attribute information AL20 to AL213 of the attribute data 33 includes identification information of lane section information to identify the section corresponding to the lane section information L20 to L213, lane type information on the type of lane, and fork/merge type information on the type of fork and merge. When the second lane is a lane which is added to a first lane as an uphill lane, the identification information of the lane section information L211, the lane type information "uphill lane", and the fork/merge type information "increase" are an example in which uphill increase information is associated with the third section information.

Figure 10:
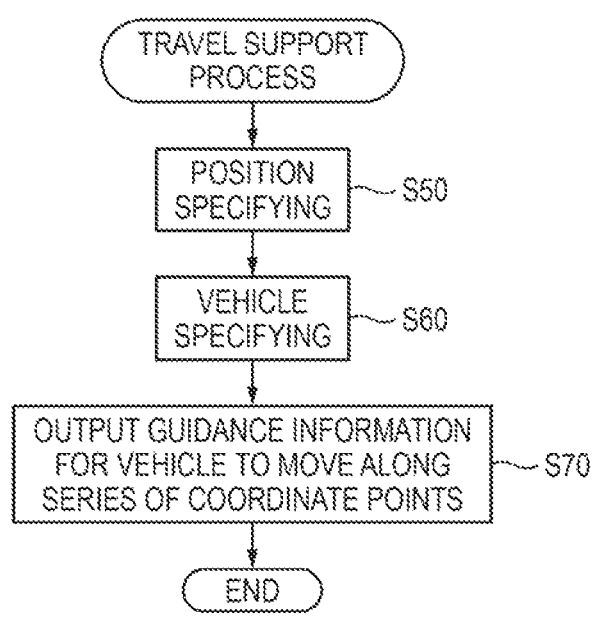
FIG. 10 is a diagram for illustrating an operation flow of the travel support process according to the first embodiment.

FIG. 10 is a diagram for illustrating an operation flow of a travel support process of the first embodiment The information control unit 3 performs a position specifying process to specify a current location of the vehicle, vehicle specifying process to specify the vehicle, and a guidance process to control the travel of the vehicle using the information on the current location specified in the position specifying process, the lane network data 31, and the attribute data 33.

The position specifying process, the vehicle specifying process, and the guidance process will be specifically described below.

The information control unit 3 (position specifying portion 12) performs the following process as the position specifying process.

From the current location information acquired by the position acquisition unit 6, the coordinates of the current location of the vehicle are calculated. It may be configured such that the coordinates of the current location of the vehicle is calculated by using surrounding image information of a vehicle such as an edge line of an actual road acquired by the surrounding information acquisition unit 8, feature data 32 such as edge line information (not illustrated) stored in the memory unit 4, and the like (Step S50).

The information control unit 3 performs the following process as the vehicle specifying process.

Identification information for identifying vehicle types such as a large vehicle, an ordinary vehicle, and a light vehicle is acquired from the vehicle and whether the vehicle is a large vehicle, an ordinary vehicle, or a light vehicle is specified. Also, based on the vehicle speed information acquired by the vehicle speed information acquisition unit 7, it may be specified whether the vehicle is a high-speed vehicle or a low-speed vehicle. In addition, it may be configured such that whether the vehicle is a large vehicle, an ordinary vehicle, or a light vehicle is specified based on the identification information input by a driver of the vehicle to the input unit 5 and it may be configured such that whether the vehicle is a high-speed vehicle or a low-speed vehicle is specified based on the vehicle speed information input by a driver of the vehicle to the input unit 5 (Step S60).

The information control unit 3 (map data acquisition portion 10, guidance portion 14) performs the following process as the guidance process.

The lane section information L20 which has the information of the coordinates closest to the coordinates of the current location calculated by the position specifying process is specified and the coordinate information of the current location is compared with the information of the series of the coordinate points included in the lane section information L20, and further guidance information for the vehicle to move along the series of coordinate points is generated, and then the guidance information is output to the vehicle control unit 9. Further, based on the identification information L211 of the lane section information included in the lane attribute information AL211 which is an association of the lane type information "uphill lane" with the fork/merge information "increase" of the section corresponding to the lane section information L211, the map data acquisition portion 10 acquires the lane type information "uphill lane" and the fork/merge type information "increase" related to the lane section information L211 from the memory unit 4. This process is an example of a process in which the control unit acquires uphill increase information related to the third section information from the map data memory unit.

Next, the guidance information to move the vehicle along the series of the coordinate points of the lane section information is generated based on the information of the vehicle specified in the vehicle specifying process and the lane type information and the fork/merge type information of the section corresponding to the lane section information L211. More specifically, when the lane type information and the fork/merge information of the section related to the acquired lane section information L211 are the lane type information "travel lane" and the fork/merge information "increase" after generating the guidance information for the vehicle to move along the series of the coordinate points of the lane section information L20 and the vehicle specified in the vehicle specifying process corresponds to any one of (1) ordinary vehicle, (2) passenger vehicle, and (3) high-speed vehicle, guidance information to move the vehicle along the series of coordinate points of the lane section information L21 from the series of the coordinate points of the lane section information L20 is generated. Those (1) ordinary vehicle, (2) passenger vehicle and (3) high-speed vehicle are examples of the first vehicle and the process described above is an example in which, when the vehicle is the first vehicle, the vehicle is guided straight from the first section to the second section based on the uphill increase information associated with the third section information.

Further, when the lane type information and the fork/merge information of the section related to the acquired lane section information L211 are lane type information "travel lane" and fork/merge information "increase" and the vehicle specified in the vehicle specifying process corresponds to any one of (4) large vehicle, (5) light vehicle, and (6) low-speed vehicle, guidance information to move the vehicle along the series of the coordinate points of the lane section information L211 from the series of coordinate points of the lane section information L20 is generated and the guidance information is output to the vehicle control unit 9. Those (4) large vehicle, (5) light vehicle, and (6) low-speed vehicle are examples of the second vehicle and the process described above is an example in which, when the vehicle is the second vehicle, the vehicle is guided from the first section to the third section based on the uphill increase information associated with the third section information (Step S70).

Second Embodiment

Next, a travel support process using a travel support system of a second embodiment will be described using FIGS. 11 to 14. The system configuration of the travel support system of the second embodiment is the same as that of the first embodiment.

Figure 11:
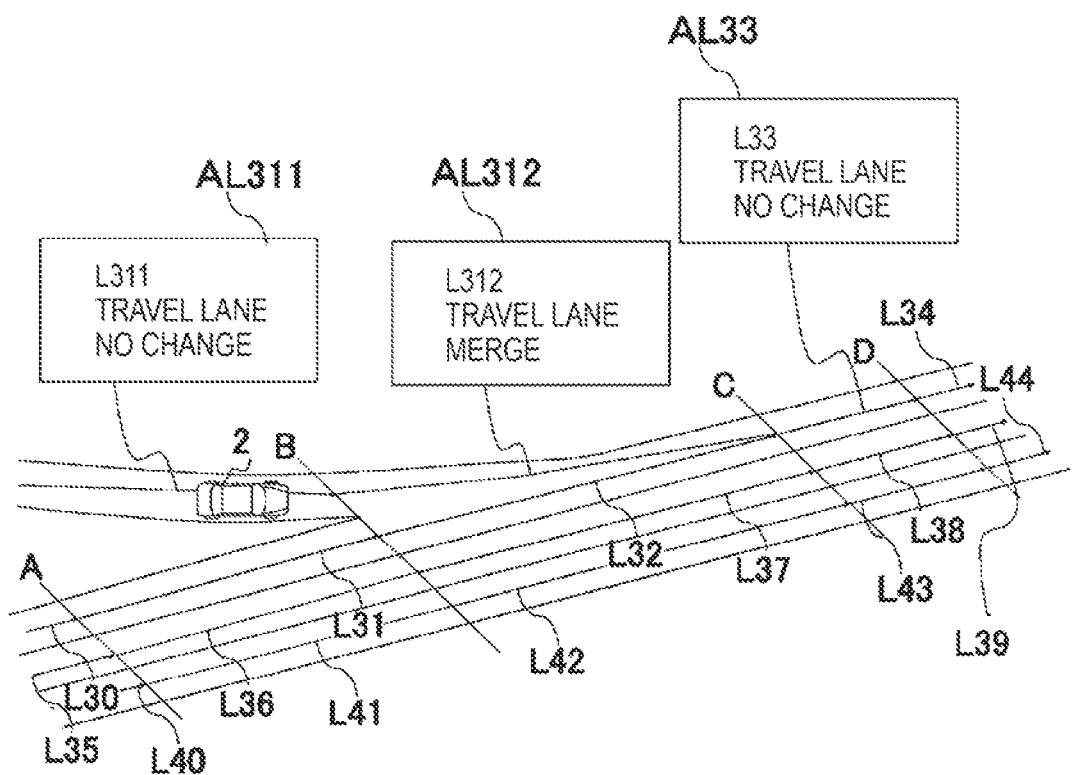
FIG. 11 is a diagram for illustrating the concept of a travel support process according to a second embodiment.

FIG. 11 is a diagram for illustrating a concept of map data 20 of the second embodiment. That is, FIG. 11 illustrates an actual road and a data structure of the road. A section to A, a section from A to B, a section from B to C, a section from C to D, and a section after D of the map data 20 respectively correspond to a section to A, a section from A to B, a section from B to C, a section from C to D, and a section after D of an actual road. The map data 20 includes lane section information L30 to L312 included in the lane network data 31 and lane attribute information AL33, AL311, and AL312 included in the attribute data 33 and each lane attribute information includes lane type information on the type of the section corresponding to the lane section information L311, L312, and L33 and fork/merge type information on the type of fork and merge. For example, the section corresponding to the lane section information L312 includes the lane type information "travel lane" and fork/merge information "merge". In order to simplify the explanation, the description of the lane type information and the fork/merge type information of the section corresponding to the lane section information L30 to L32 and the lane section information L34 to L44 are omitted. The lane section information L312 is an example of fourth section information corresponding to a fourth section included in the third lane. Further, when the third lane is a lane which is merged with another lane, the lane type information "travel lane" and the fork/merge information "merge" associated with the lane section information L312 are an example of merge information associated with the fourth section information.

FIG. 12 is a diagram for illustrating details of the map data 20 of the second embodiment.

Each of pieces of the lane section information L30 to L312 included in the lane network data 31 includes identification information to identify the lane section information, coordinate information indicating a series of coordinate points of the centerline of the lane corresponding to the lane section information 130 to L312, exit side identification information which is the identification information of the lane section information corresponding to a section on the exit side of the section corresponding to the lane section information L30 to L312, entry side identification information which is identification information of the lane section information corresponding to a section on the entry side of the section corresponding to the lane section information L30 to L312, and the like. Also, the connection between the front and the rear of the lane is represented by the exit side identification information and the entry side identification information.

FIG. 13 is a diagram for illustrating e details of the map data in the second embodiment.

Each of pieces of the lane attribute information AL30 to AL312 included in the attribute data 33 includes the identification information of lane section information to identify the section corresponding to lane section information L30 to L312, the lane type information on the lane type, and the fork/merge type information on the type of fork and merge.

Figure 14:
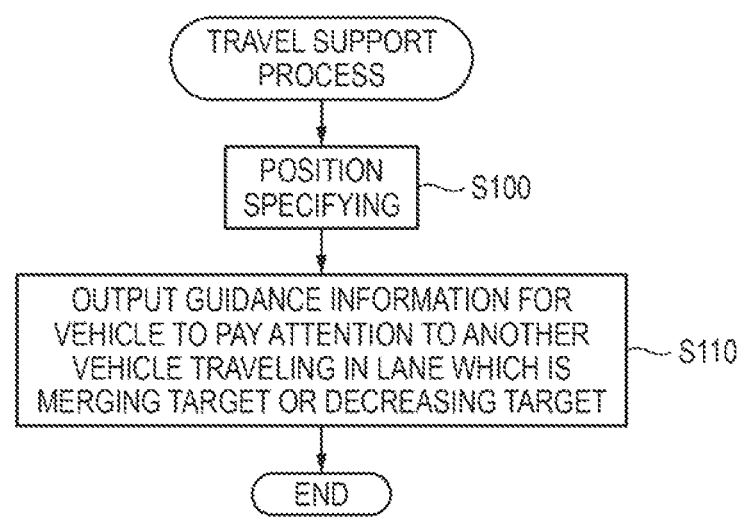
FIG. 14 is a diagram for illustrating an operation flow of a travel support process according to the second embodiment.

FIG. 14 is a diagram for illustrating an operation flow of the travel support process of the second embodiment.

The information control unit 3 performs the position specifying process to specify the current location of the vehicle, and a guidance process using the information of the current location specified in the position specifying process, the lane network data 31, and the attribute data 33 so that the vehicle pays attention to other vehicles traveling in a merge target lane.

The position specifying process and the guidance process will be specifically described below.

The information control unit 3 (position specifying portion 12) performs the following process as the position specifying process.

From the current location information acquired by the position acquisition unit 6, the coordinates of the current location of the vehicle are calculated. It may be configured such that the coordinates of the current location of the vehicle is calculated by using surrounding image information of a vehicle such as an edge line of an actual road acquired by the surrounding information acquisition unit 8, feature data 32 such as edge line information (not illustrated) stored in the memory unit 4, and the like (Step S100).

The information control unit 3 (map data acquisition portion 10, guidance portion 14) performs the following process as the guidance process.

The lane section information L312 which has the information of the coordinates closest to the coordinates of the current location calculated by the position specifying process is specified and the coordinate information of the current location is compared with the information of the series of the coordinate points included in the lane section information L312, and further guidance information for the vehicle to move along the series of coordinate points is generated, and then the guidance information is output to the vehicle control unit 9. Further, based on the identification information L312 of the lane section information included in the lane attribute information AL312 which is an association of the lane type information "travel lane" with the fork/merge information "merge" of the section corresponding to the lane section information L312, the map data acquisition portion 10 acquires the lane type information "travel lane" and the fork/merge type information "merge" related to the lane section information L312 from the memory unit 4. Based on the fork/merge type information "merge" of the section corresponding to the lane section information L312, the guidance information is generated for the vehicle to pay attention to other vehicles traveling in the section corresponding to the lane section information L32, which is the merge target section and the guidance information is output to the surrounding information acquisition unit 8 and/or the vehicle control unit 9. As an example of the guidance information, there are provided information to control the vehicle control unit 9 to make the vehicle join at a timing when other vehicles do not approach in the merge target lane, information to make the vehicle control unit 9 perform control to accelerate the traveling speed of the vehicle in order for the vehicle to join the merge target lane, information for the surrounding information acquisition unit 8 to start acquiring image information on a lane side which is the lane on the vehicle merge target side, and the like. Here, in addition to the vehicle traveling on a section corresponding to the lane section information L32 which is the merge target section, based on the exit side identification information L33 and the entry side identification information L31 of the lane section information L32, the guidance information may be generated so that the vehicle pays attention to the other vehicles traveling on the section corresponding to the lane section information L31 and the lane section information L33 and the guidance information may be output to the surrounding information acquisition unit 8 and/or the vehicle control unit 9. The guidance process described above is an example of controlling the vehicle to pay attention to other vehicles traveling in the merge target lane based on the merge information associated with the fourth section information.

In addition, the information control unit 3 may perform the following process as a guiding process similar to the guiding process using the fork/merge type information "merge" described above.

In FIG. 3 described above, the lane section information L113 which has the information of the coordinates closest to the coordinates of the current location calculated by the position specifying process is specified and the guidance information is generated for the vehicle to pay attention to other vehicles traveling in a section corresponding to lane section information L13 which is the decrease target lane based on the fork/merge type information "decrease" of the section corresponding to the lane section information L113, and then the guidance information is output to the surrounding information acquisition unit 8 and/or the vehicle control unit 9. Here, based on the exit side identification information L14 and the entry side identification information L12 of the lane section information L13, control information may be generated to pay attention to the other vehicles traveling on the sections corresponding to the lane section information L12 and the lane section information L14 and the control information may be output to the surrounding information acquisition unit 8 and/or the vehicle control unit 9. When the third lane is a lane which merges with another lane, the fork/merge type information "decrease" in the lane section information L113 is an example of merge information associated with the fourth section information.

Third Embodiment

Next, a travel support process using a travel support system of a third embodiment will be described using FIGS. 15 to 17. The system configuration of the travel support system of the third embodiment is the same as that of the first embodiment.

Figure 15:
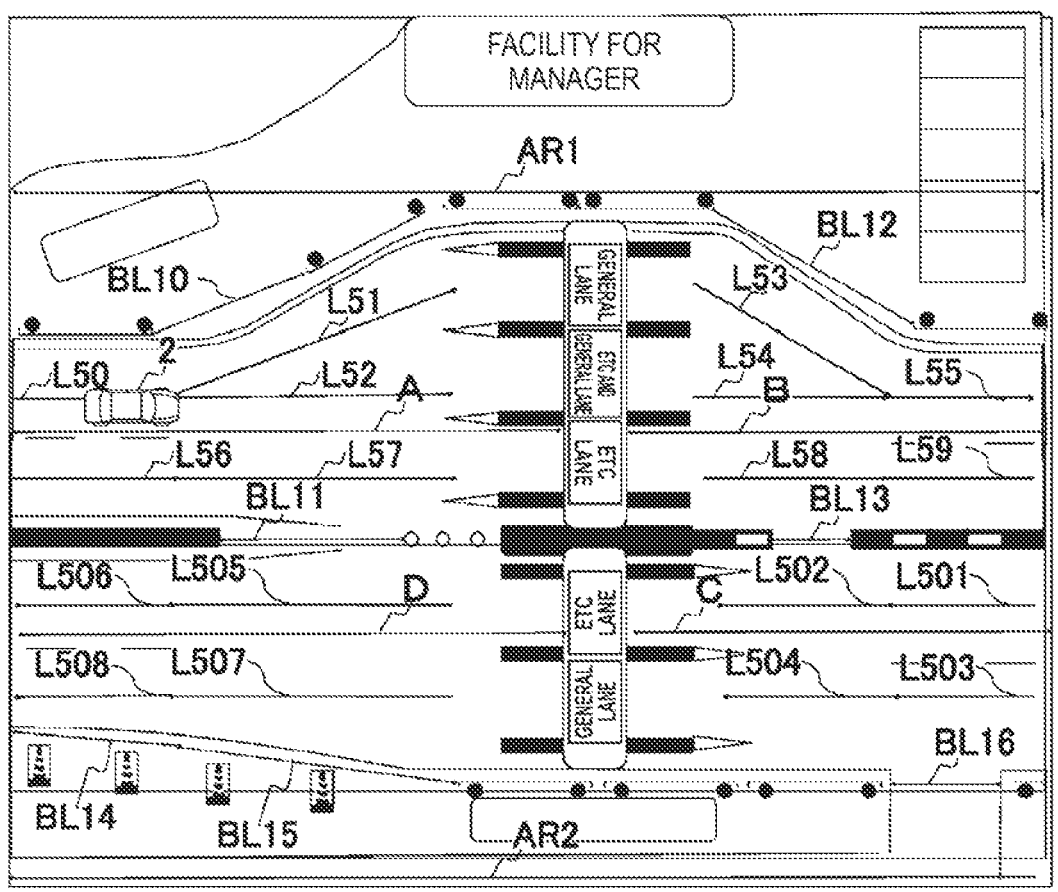
FIG. 15 is a diagram for illustrating the concept of a travel support process according to a third embodiment.

FIG. 15 is a diagram for illustrating a concept of map data 20 of the third embodiment. That is, FIG. 15 illustrates an actual road (around a tollgate of an expressway or the like) and a data structure of the road. Areas A to D respectively correspond to areas A to D of an actual road and areas AR1 and AR2 respectively correspond to areas AR1 and AR2 of the actual road. The areas A to D are road areas at the entrance to the tollgate of the expressway and the exit from the tollgate and the area AR1 is a manager's facility for managing the facilities of the expressway, the tollgate, and the like. The areas A to D described above are an example of a first area constituting a part of the road and the areas AR1 and AR2 are examples of second areas which constitute a part of the road and are adjacent to the first area in the width direction of the road.

Each of BL10 to BL16 of the feature data 32 indicates boundary line information. The boundaries are physically passable, but define the boundaries between the area AR1 and the area A and the area B and between the area AR2 and the area C and the area D. Although the boundary between the first area constituting a part of the road and the second area constituting a part of the road and adjacent to the first area in a width direction of the road is physically passable, BL10 to BL16 described above are examples of boundary line information defining the boundary between the first area and the second area.

The lane section information included in the lane network data 31 is associated with boundary line information. More specifically, lane section information L51 is associated with the boundary line information BL10, and lane section information L57 is associated with the boundary line information BL11, and further lane section information L53 is associated with the boundary line information BL12, and still further lane section information L58 is associated with the boundary line information BL13, and still further lane section information L508 is associated with the boundary line information BL14, and still further lane section information L507 is associated with the boundary line information BL15, and still further lane section information L503 is associated with the boundary line information BL16. The lane section information is an example of travel line information indicating a travel line for the vehicle to travel in the first area. Associating the lane section information with the boundary line information is an example in which travel line information and the boundary line information are associated with each other.

FIG. 16 is a diagram for illustrating details of map data of the third embodiment. Each of pieces of the boundary line information BL10 to BL16 includes identification information lane section information to identify the lane section information associated with the boundary line information, road boundary line identification information to identify the boundary line information, road boundary line coordinate information indicating a series of coordinate points of the centerline of the boundary corresponding to the boundary line information, and boundary line identification information to identify whether the boundary line indicated by the road boundary line coordinate information is a physically passable boundary line (virtual boundary line) or a boundary line which cannot be physically passed either by a protective wall or the like. The boundary identification information includes information of "1" when it is a virtual boundary and information of "0" when it is not a virtual boundary. Each of the pieces of the boundary line information has lane section information so that the lane section information and the boundary line information are associated with each other. Further, the details of the lane section information L50 to L59 and the lane section information L501 to L508 are the same as those of the lane section information described in FIG. 4 of the first embodiment.

Figure 17:
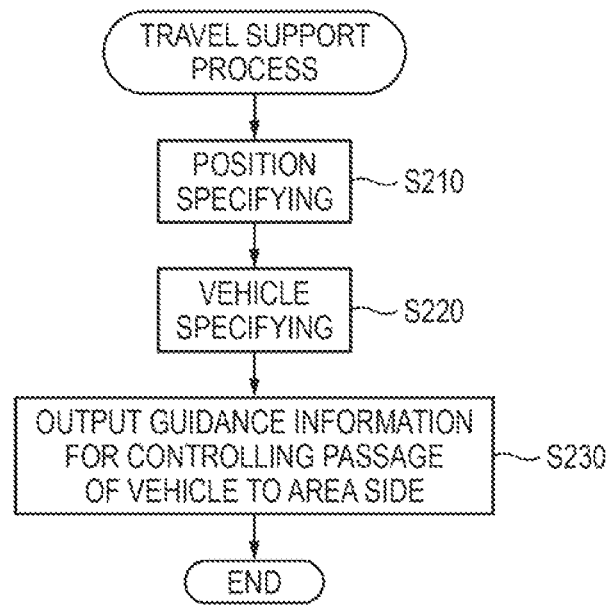
FIG. 17 is a diagram for illustrating an operation flow of a travel support process according to the third embodiment.

FIG. 17 is a diagram for illustrating an operation flow of the travel support process of the third embodiment.

The information control unit 3 performs a position specifying process to specify the current location of the vehicle, a vehicle specifying process to specify the vehicle, and a guidance process to control the travel of the vehicle using the information of the current location specified by the position specifying process, the lane network data 31, and the feature data 32. The position specifying process, the vehicle specifying process, and the guidance process will be specifically described below.

The information control unit 3 (position specifying portion 12) performs the following process as the position specifying process.

From the current location information acquired by the position acquisition unit 6, the coordinates of the current location of the vehicle are calculated. It may be configured such that the coordinates of the current location of the vehicle is calculated by using surrounding image information of a vehicle such as an edge line of an actual road acquired by the surrounding information acquisition unit 8, feature data 32 such as edge line information (not illustrated) stored in the memory unit 4, and the like (Step S210).

The information control unit 3 performs the following process as the vehicle specifying process.

Identification information for identifying whether the vehicle is a management vehicle indicating a facility manager's vehicle for managing facilities and tollgates of the expressway or a general vehicle indicating a general vehicle is obtained from the vehicle and whether the vehicle is a management vehicle or a general vehicle is specified. It may be configured such that whether the vehicle is a management vehicle or a general vehicle is specified based on information input to the input unit 5 by a driver of the vehicle (Step S220).

The information control unit 3 (guidance portion 14) performs the following process as the guidance process.

The lane section information L51 which has the information of the coordinates closest to the coordinates of the current location calculated by the position specifying process is specified and the coordinate information of the current location is compared with the information of the series of the coordinate points included in the lane section information L51, and further guidance information for the vehicle to move along the series of coordinate points is generated, and then the guidance information is output to the vehicle control unit 9. The map data acquisition portion 10 acquires the boundary line information BL10 from the memory unit 4 based on the lane section identification information L51 included in the boundary line information BL10. This process is an example of a process used in a process where the control unit acquires boundary line information associated with travel line information from the map data memory unit.

The value of the boundary line identification information of the boundary line information BL10 is determined, and when the value is "1", the following process is performed.

When the vehicle specified in the vehicle specifying process is a general vehicle and the vehicle is moved to the end of the area AR2 due to some circumstances (such as a failure of the vehicle), based on the road boundary line coordinate information of the boundary line information BL10, the vehicle traveling on the section corresponding to the lane section information L51 is prohibited from passing to the area AR1 side. Specifically, control is performed so that the vehicle does not exceed the boundary line defined by the coordinate of the road boundary line coordinate information. This process is an example of a process for prohibiting the vehicle passing through the first area from passing to the second area side based on the boundary line information.

When the vehicle specified in the vehicle specifying process is a management vehicle, based on the boundary line information BL10, the guidance information which allows the vehicle traveling in the section corresponding to the lane section information L51 to pass to the area AR1 side is generated and the guidance information is output to the vehicle control unit 9. Specifically, the vehicle is controlled to travel to the area AR1 side beyond the boundary line defined by the coordinates of the road boundary line coordinate information. This process is an example of a process for permitting passage to the second area side according to the vehicle passing through the first area based on the boundary line information (Step S230).

If the value of the boundary line identification information of the acquired boundary line information is determined and the value is "0", it is controlled so that the coordinates of the road boundary line coordinate information of the boundary line information do not exceed the specified boundary line regardless of whether the vehicle is a general vehicle or a management vehicle.

The present disclosure is not limited to the embodiments described above and can be implemented in various modes within a range without departing from the scope of the disclosure. For example, the following modifications are also possible.

In the embodiments described above, examples are described in which each of pieces of the lane attribute information included in the lane network data 31 includes the exit side identification information, the entry side identification information, the lane type information, and the fork and merge type information. In addition to this, in order to specify the section (right section, left section) adjacent to the section corresponding to the lane section information, the identification information of lane section information of the adjacent section and permission level information of lane change to the adjacent section may be included.

Here, the lane change permission level indicating the lane change permission level is data indicating the availability of lane change. The lane change permission level is set to at least one of a plurality of restriction levels having different reasons for the lane change restriction. In the embodiment, as a reason for the restriction of the lane change, the presence of physical obstacles and the presence of the legal regulations are distinguished and one of the five restriction levels from level 1 to level 5 shown below is selected and set.

Level 1: The section is provided with physical boundaries, such as sections with walls, fences, guardrails, delineators, or the like, and the adjacent lane is opposite to the traveling direction of travel, and this indicates that lane change (transfer) is not available.

Level 2: It is a section with physical obstacles and legal regulations and there are physical obstacles such as road cones, pole cones and cat's eyes as physical obstacles, and further this basically indicates that lane change (transfer) is not available.

Level 3: Although there are no physical obstacles, this section has legal regulations. This indicates that it is basically not available to change lanes (transfer), for example, because it is a lane-change-regulated lane that is exclusively used for straight ahead, or a yellow solid line is drawn, and overtravel is prohibited.

Level 4: It is a section where there are physical obstacles but no legal regulations and this basically indicates that it is not available to change lanes (transfer).

Level 5: This section indicates that there are no physical obstacles or legal regulations. Further, lane change (transfer) is available and lane change in that section is recommended.

Below, a modification example 1 which uses the lane change permission level is described.

First Modification Example

Figure 18:
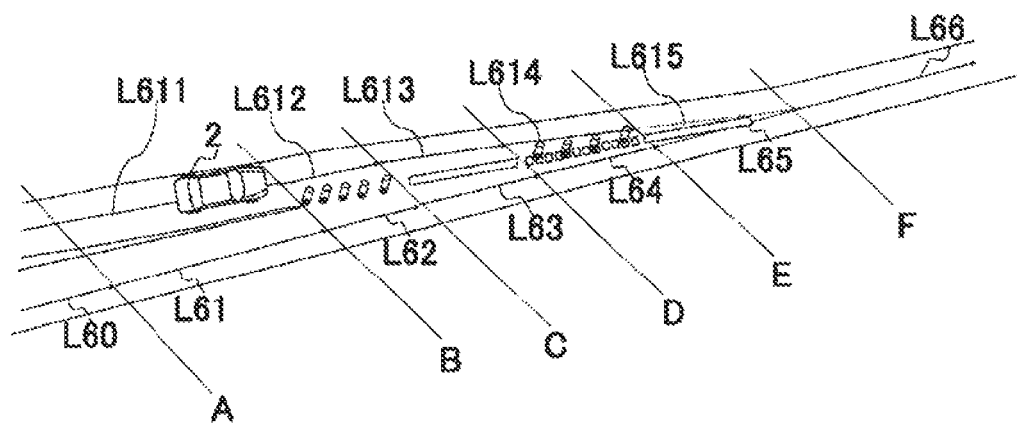
FIG. 18 is a diagram for illustrating the concept of a travel support process according to a first modification example.

FIG. 18 is a diagram for illustrating a concept of map data 20 of a first modification example. That is, FIG. 18 illustrates an actual road and a data structure of the road. In addition, as the vehicle progresses, it is changed to the wall (section from A to B), the yellow solid line with poles (section from B to C), the yellow solid line (section from C to D), the white broken line with poles (section from D to E), and the white broken line (section from E to F).

FIG. 19 is a diagram for illustrating a data structure of the map data 20 of the first modification example.

Each of pieces of lane attribute information AL611 to AL615 included in the attribute data 33 includes identification information for identifying lane section information, lane type information, fork/merge information identification information of left-and-right-lanes lane section information for specifying the lanes adjacent to the lane, and left and right lane change permission level information indicating the lane change permission level.

Figure 20:
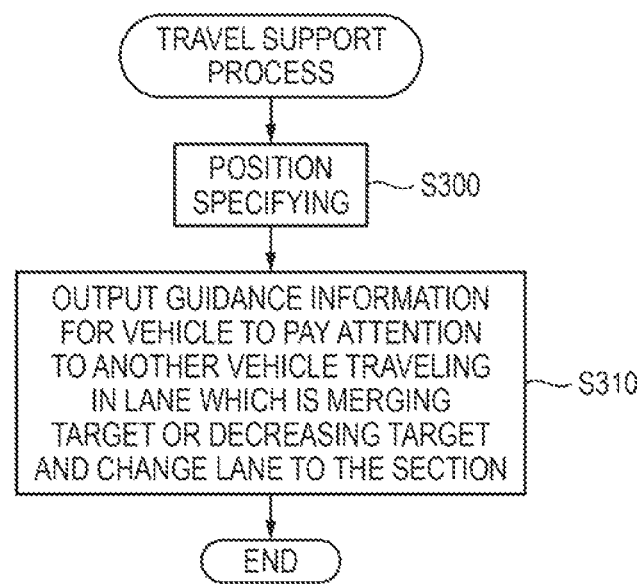
FIG. 20 is a diagram for illustrating an operation flow of the travel support process according to the first modification example.

FIG. 20 is a diagram for illustrating an operation flow of travel support process of the first modification example.

The information control unit 3 performs a position specifying process for specifying the current location of the vehicle and a guidance process such that the vehicle pays attention to the other vehicles traveling in the lane adjacent to the lane where the vehicle travels and changes the lane to the adjacent lane by using the current location information specified in the position specifying process, the lane network data 31, and the attribute data 33. The position specifying process and the guidance process will be specifically described below.

The information control unit 3 (position specifying portion 12) performs the following process as the position specifying process.

From the current location information acquired by the position acquisition unit 6, the coordinates of the current location of the vehicle are calculated. It may be configured such that coordinates of the current location of the vehicle are calculated by using surrounding image information of the vehicle such as an edge line of an actual road acquired by the surrounding information acquisition unit 8, the feature data 32 such as (not illustrated) edge line information stored in memory unit 4, and the like (Step S300).

The information control unit 3 performs the following process as the guidance process.

The lane section information L611 which has the information of the coordinates closest to the coordinates of the current location calculated by the position specifying process is specified and it is determined that the section corresponding to the lane section information L611 is adjacent to the section corresponding to the lane section information L61 based on the right-lane lane section information identification information. Next, based on the right-lane lane change permission level of the lane section information L611, it is determined that the lane change to the section corresponding to the lane section information L61 is not possible. Therefore, no lane change is made in the section corresponding to the lane section information L611. In addition, control information to make the vehicle to pay attention to other vehicles traveling in the adjacent section corresponding to the lane section information L61 based on the fork/merge information "merge" is not generated.

The lane section information L612 which has the information of the coordinates closest to the coordinates of the current location calculated by the position specifying process is specified and it is determined that the section corresponding to the lane section information L612 is adjacent to the section corresponding to the lane section information L62 based on the right-lane lane section information identification information. Next, based on the right-lane lane change permission level of the lane section information L612, it is determined that the lane change to the section corresponding to the lane section information L62 is not possible. Therefore, no lane change is made in the section corresponding to the lane section information L612. Further, control information to make the vehicle to pay attention to other vehicles traveling in the adjacent section corresponding to the lane section information L62 based on the fork/merge information "merge" is not generated.

The lane section information L613 which has the information of the coordinates closest to the coordinates of the current location calculated by the position specifying process is specified and it is determined that the section corresponding to the lane section information L613 is adjacent to the section corresponding to the lane section information L63 based on the identification information of right-lane lane section information. Then, based on the right-lane lane change permission level of the lane section information L613, it is determined that the lane change to the section corresponding to the lane section information L63 is not possible. Therefore, no lane change is made in the section corresponding to the lane section information L613. In addition, control information to make the vehicle to pay attention to other vehicles traveling in the adjacent section corresponding to the lane section information L63 based on the fork/merge information "merge" is not generated.

The lane section information L614 which has the information of the coordinates closest to the coordinates of the current location calculated by the position specifying process is specified and it is determined that the section corresponding to the lane section information L614 is adjacent to the section corresponding to the lane section information L64 based on the identification information of right-lane lane section information. Then, based on the right-lane lane change permission level of the lane section information L614, it is determined that the lane change to the section corresponding to the lane section information L64 is not possible. Therefore, no lane change is made in the section corresponding to the lane section information L614. In addition, control information to make the vehicle to pay attention to other vehicles traveling in the adjacent section corresponding to the lane section information L64 based on the fork/merge information "merge" is generated and the control information is output to the vehicle control unit 9.

The lane section information L615 which has the information of the coordinates closest to the coordinates of the current location calculated by the position specifying process is specified and it is determined that the section corresponding to the lane section information L615 is adjacent to the section corresponding to the lane section information L65 based on the identification information of right-lane lane section information of the lane section information L615. Then, based on the right-lane lane change permission level, it is determined that the lane change to the section corresponding to the lane section information L65 is possible. Next, in the section corresponding to the lane section information L615, the guidance information to make the vehicle to pay attention to the other vehicles traveling on the adjacent section corresponding to the lane section information L65 and to change the lane to the section is generated and the guidance information is output to the vehicle control unit 9 (Step S310).

In the processes described above, in the section corresponding to the lane section information L612, the section corresponding to the lane section information L613, and the section corresponding to the lane section information L614, control is performed not to change the lane. However, when it is necessary to change the lane due to certain situations (for example, a situation where the vehicle cannot go ahead of the lane due to an accident, obstacles or the like, or emergency), the guidance information to make lane change is generated and the guidance information is output to the vehicle control unit 9. That is, when the lane change level is 2 to 4, the guidance information to perform lane change is generated according to the situation and the guidance information is output to the vehicle control unit 9.

The information control unit 3 may change the output level of the guidance information according to the lane change permission level. For example, in the processes described above, based on the right-lane lane change permission level 4 of the section corresponding to the lane section information L614 and the fork/merge information "merge" of the lane section information L614, output level 1 (attention reminding) of the guidance control information which makes the vehicle pay attention to other vehicles traveling on the section corresponding to the lane section information L64 is output. Based on the right-lane lane change permission level 5 of the section corresponding to the lane section information L615 and the fork/merge information "merge" of the lane section information L615, output level 2 (acceleration or deceleration information, traveling direction information) of the guidance information which makes the vehicle pay attention to other vehicles traveling on the adjacent section corresponding to the lane section information L65 is output.

In addition, the lane attribute information having the above-described identification information of lane section information, the identification information of left-lane lane section information, the left-lane lane change permission level, the identification information of right-lane lane section information, and the right-lane lane change permission level is provided corresponding to the road section which has a plurality of lanes that are not a fork/merge location, and using such lane attribute information, the information control unit 3 generates the guidance information so that lane changes can be made in sections where the lane change permission level is 5, and further when it is necessary to change the lane due to certain situations (for example, a situation where the vehicle cannot go ahead of the lane due to an accident, obstacles or the like, or emergency), the guidance information for performing lane change may be generated even in sections where the lane change level is 2 to 4 and the guidance information may be output to the vehicle control unit 9.

In the embodiment described above, an example of the boundary line information which is physically passable but defines the boundary between areas has been described. In addition to this, it may include road shoulder width information on the width of the adjacent road shoulder for each section corresponding to the lane section information. Below, a second modification example using the road shoulder width information will be described.

Second Modification Example

FIG. 21 is a diagram for illustrating a concept of map data 20 of a second modification example. That is, FIG. 21 illustrates an actual road and a data structure of the road. Lane section information L71 is associated with boundary line information BL20, and lane section information L72 is associated with boundary line information BL21. Pieces of the boundary line information B120 and BL21 are respectively boundary lines of the area AR11 and the area AR12. Also, the lane section information L71 is associated with road shoulder width information W1 and the lane section information L72 is associated with the road shoulder width information W2.

FIG. 22 is a diagram for illustrating details of a data structure of the map data 20 of the second modification example.

Each of pieces of boundary line information BL20 and BL21 includes identification information of lane section information to identify lane section information associated with the boundary line information, road boundary line identification information to identify the boundary line information, road boundary line coordinate information to indicate a series of coordinate points of the centerline of the boundary corresponding to the boundary line information, road boundary line position information to indicate whether the road boundary line is to the left or right of the section corresponding to the related lane section information, and left and right road shoulder width information (in meter unit) of the section corresponding to the lane section information.

Figure 23:
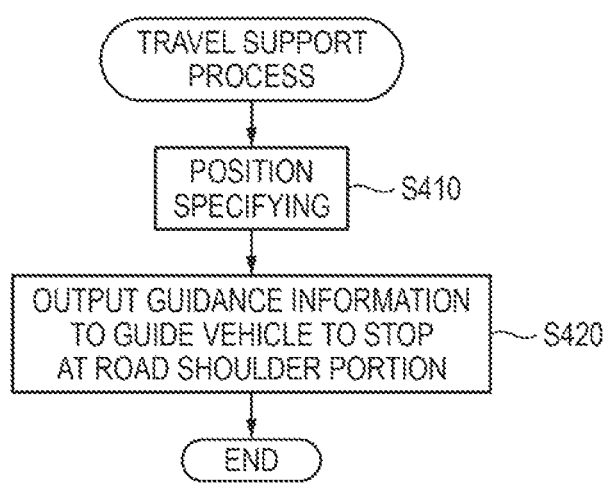
FIG. 23 is a diagram for illustrating an operation flow of the travel support process according to the second modification example.

FIG. 23 is a diagram for illustrating an operation flow of the travel support process of the second modification example.

The information control unit 3 performs a position specifying process for specifying the current location of the vehicle and a guidance process such that the travel of the vehicle is controlled by using the current location information specified in the position specifying process, the lane network data 31, and the feature data 32. The position specifying process and the guidance process will be specifically described below.

The information control unit 3 (position specifying portion 12) performs the following process as the position specifying process.

From the current location information acquired by the position acquisition unit 6, the coordinates of the current location of the vehicle are calculated. It may be configured such that coordinates of the current location of the vehicle are calculated by using surrounding image information of the vehicle such as an edge line of an actual road acquired by the surrounding information acquisition unit 8, the feature data 32 such as (not illustrated) edge line information stored in memory unit 4, and the like (Step S410).

The information control unit 3 (guidance portion 14) performs the following process as the guidance process.

The lane section information L71 which has the information of the coordinates closest to the coordinates of the current location calculated by the position specifying process is specified and the coordinate information of the current location is compared with the information of the series of the coordinate points included in the lane section information L71, and then guidance information for the vehicle to move along the series of the coordinate points is generated and the guidance information is output to the vehicle control unit 9. Next, when it becomes necessary to stop the vehicle due to some circumstances (such as a failure of the vehicle), the map data acquisition portion 10 acquires the boundary line information BL20 from the memory unit 4 based on the lane section identification information L71 included in the boundary line information BL20. The vehicle width information on the width of the vehicle is compared with the right and left road shoulder width information of the section corresponding to the lane section information L71 and it is determined whether the vehicle can stop on the road boundary line side corresponding to the road boundary line information. For example, when the vehicle width information is 1.7 m, the vehicle width information is wider than the left road shoulder width information in comparison with the left road shoulder width information 1.5 m of the section corresponding to lane section information L71, and therefore, it is determined that the vehicle cannot stop on the road boundary line side corresponding to the road boundary line information B120.

Next, the lane section information L72 which has the information of the coordinates closest to the coordinates of the current location calculated by the position specifying process is specified and the coordinate information of the current location is compared with the information of the series of the coordinate points included in the lane section information L72, and then guidance information for the vehicle to move along the series of the coordinate points is generated and the guidance information is output to the vehicle control unit 9. In addition, the boundary line information BL21 is acquired based on the lane section identification information L72 included in the boundary line information BL21 associated with the lane section information L72. Then, the vehicle width information on the width of the vehicle is compared with the right and left road shoulder width information of the section corresponding to the lane section information L72 and it is determined whether the vehicle can stop on the road boundary line side corresponding to the road boundary line information. For example, when the vehicle width information is 1.7 m, the vehicle width information is narrower than the left road shoulder width information in comparison with the left road shoulder width information 4.0 m of the section corresponding to lane section information L72, and therefore, it is determined that the vehicle can stop on the road boundary line side corresponding to the road boundary line information BL21. Next, based on the road boundary line coordinate information of the boundary line information BL21, guidance information which guides the vehicle to stop at the road shoulder portion in such a way that the coordinates of the road boundary coordinate information of the boundary line information do not cross the specified boundary line and the guidance information is output to the vehicle control unit 9 (Step S420).

It may be configured such that the information described in at least two of the first to third embodiments and the first and second modification examples is included as the map data 20 and, by using the map data 20, all the processes described in at least two of the process (FIG. 6) of the first embodiment, the process (FIG. 14) of the second embodiment, the process (FIG. 17) of the third embodiment, the process (FIG. 20) of the first modification example, and the process (FIG. 23) of the second modification example are performed. Further, it may be configured such that the information described in all of the first to third embodiments and the first and second modification examples is included as the map data 20 and, by using the map data 20, all the processes described in at least all the two of the process (FIG. 6) of the first embodiment, the process (FIG. 14) of the second embodiment, the process (FIG. 17) of the third embodiment, the process (FIG. 20) of the first modification example, and the process (FIG. 23) of the second modification example are performed.

The lane extension section realized by Patent Literature 1 is uniform without considering the characteristics of the lane extension section and the characteristics of the vehicle. Even in the same lane extension section, due to the difference in the increase in traveling and the increase in slopes, and the difference in the characteristics of the vehicle, the guidance might not always be a desirable one. The embodiments described above solve those problems.

The aspects described in all or a part of the embodiments described above solve any one problem of providing a travel support device capable of appropriately guiding and controlling a moving body and a data structure of map data used for the travel support device; improvement of processing speed; improvement of processing accuracy; improvement of usability; improvement of functions using data or provision of appropriate functions; improvement of other functions or provision of appropriate functions; reduction of data and/or program capacity; provision of data, programs, recording media, devices and/or systems appropriate for downsizing of devices and/or systems; and optimization of production/manufacturing of data, programs, recording media, devices and/or systems, such as reduction of production/manufacturing costs of data, programs, devices or systems, facilitation of production/manufacturing, and shortening of production/manufacturing time.

Although the disclosure has been described in detail and with reference to specific embodiments, it will be apparent to those skilled in the art that various changes and modifications can be made without departing from the spirit and scope of the disclosure.

This application is based on Japanese Patent Application (Application No. 2017-087802) filed on Apr. 27, 2017, the contents of which are incorporated herein by reference.

REFERENCE SIGNS LIST 1 travel support system
2 vehicle
3 information control unit
4 memory unit
5 input unit
6 position acquisition unit
7 vehicle speed information acquisition unit
8 surrounding information acquisition unit
9 vehicle control unit
10 map data acquisition portion
11 route search portion
12 position specifying portion
13 route specifying portion
14 guidance portion
20 map data
30 road network data
31 lane network data
32 feature data
33 attribute data
L10 to L615 lane section information
AL10 to AL615 lane attribute information
A to D, AR1 to AR12 area
BL10 to BL21 boundary line information

The invention claimed is:

1. A travel support device which supports travel of a vehicle, comprising:
a memory that stores
first section information regarding a first section included in a first lane constituting a part of a road,
second section information regarding a second section adjacent to a front in a traveling direction of the first section, and
third section information regarding a third section included in a second lane which is a lane constituting a part of the road, wherein the second lane is added to and splits off from the first lane, the second lane is adjacent to the first lane in a width direction of the road, the third section is a section adjacent to the second section in the width direction of the road, travelling lane increase information, indicating that a travelling lane is increased, is associated with the third section information in a case where the second lane is a lane which is added to and splits off from the first lane as the traveling lane, and uphill lane increase information, indicating that an uphill lane is increased, is associated with the third section information in a case where the second lane is a lane which is added to and splits off from the first lane as the uphill lane; and
processing circuitry configured to
guide the vehicle from the first section to the third section based on the travelling lane increase information associated with the third section information, regardless of whether the vehicle is a first type or a second type,
guide the vehicle straight from the first section to the second section based on the uphill lane increase information associated with the third section information in response to determining that the vehicle is the first type, and
guide the vehicle from the first section to the third section based on the uphill lane increase information associated with the third section information in response to determining that the vehicle is the second type.

2. The travel support device according to claim 1, wherein the processing circuitry is configured to guide the vehicle by performing a drive assist.

3. The travel support device according to claim 1, wherein the processing circuitry is configured to determine whether the vehicle is the first type or the second type.

4. The travel support device according to claim 1, wherein the processing circuitry is configured to determine whether the vehicle is the first type or the second type using identification information of the vehicle.

5. The travel support device according to claim 4, wherein the identification information of the vehicle indicates a size of the vehicle.

6. The travel support device according to claim 1, wherein the processing circuitry is configured to:
acquire speed information of the vehicle; and
determine whether the vehicle is the first type or the second type using the acquired speed information.

7. The travel support device according to claim 1, wherein the memory stores fourth section information regarding a fourth section included in a third lane constituting a part of the road,
the fourth section information is associated with at least one of merge information or decrease information,
the merge information is associated with the fourth section information in a case where the third lane is a lane which merges with another lane, and
the decrease information is associated with the fourth section information in a case where the third lane is a decreasing lane.

8. The travel support device according to claim 7, wherein the processing circuitry is configured to control the vehicle in view of another vehicle traveling in a lane, which is a merging target or a decreasing target, based on either the merge information or the decrease information associated with the fourth section information.

9. The travel support device according to claim 8, wherein the processing circuitry is configured to control the vehicle to avoid collision with the another vehicle.

10. A non-transitory computer-readable medium having encoded thereon a data structure of map data, the data structure comprising:
first section information regarding a first section included in a first lane constituting a part of a road;
second section information regarding a second section adjacent to a front in a traveling direction of the first section; and
third section information corresponding to a third section included in a second lane which is a lane constituting a part of the road, wherein the second lane is added to and splits off from the first lane, the second lane is adjacent to the first lane in a width direction of the road, the third section is a section adjacent to the second section in the width direction of the road, travelling lane increase information, indicating that a travelling lane is increased, is associated with the third section information in a case where the second lane is a lane which is added to and splits off from the first lane as a traveling lane, and uphill lane increase information, indicating that an uphill lane is increased, is associated with the third section information in a case where the second lane is a lane which is added to and splits off from the first lane as an uphill lane, wherein the travelling lane increase information associated with the third section information is used to guide a vehicle from the first section to the third section, and the uphill lane increase information associated with the third section information is used to guide the vehicle either straight from the first section to the second section, or from the first section to the third section depending on whether the vehicle is a first type or a second type.

11. The non-transitory computer-readable medium according to claim 10, wherein the travelling lane increase information associated with the third section information is used to guide the vehicle from the first section to the third section, regardless of whether the vehicle is the first type or the second type.

12. The non-transitory computer-readable medium according to claim 10, wherein the uphill lane increase information associated with the third section information is used to guide the vehicle either straight from the first section to the second section in a case where the vehicle is the first type.

13. The non-transitory computer-readable medium according to claim 10, wherein the uphill lane increase information associated with the third section information is used to guide the vehicle from the first section to the third section in a case where the vehicle is the second type.

14. The non-transitory computer-readable medium according to claim 10, wherein the vehicle is guided by performing a drive assist.

15. The non-transitory computer-readable medium according to claim 10, wherein the vehicle is determined to be either the first type or the second type using identification information of the vehicle.

16. The non-transitory computer-readable medium according to claim 15, wherein the identification information of the vehicle indicates a size of the vehicle.

17. The non-transitory computer-readable medium according to claim 10, wherein the vehicle is determined to be either the first type or the second type using speed information of the vehicle.

18. The non-transitory computer-readable medium according to claim 10, wherein the data structure further comprises fourth section information regarding a fourth section included in a third lane constituting a part of the road, the fourth section information is associated with at least one of merge information or decrease information, the merge information is associated with the fourth section information in a case where the third lane is a lane which merges with another lane, the decrease information is associated with the fourth section information in a case where the third lane is a decreasing lane.

19. The non-transitory computer-readable medium according to claim 18, wherein either the merge information or the decrease information associated with the fourth section information is used to control the vehicle in view of another vehicle traveling in a lane, which is a merging target or a decreasing target.

* * * * *